United States Patent
Sawada et al.

(10) Patent No.: US 8,305,641 B2
(45) Date of Patent: Nov. 6, 2012

(54) IMAGE-PROCESSING SYSTEM

(75) Inventors: Kazuhide Sawada, Nagoya (JP);
Masashi Ueda, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 763 days.

(21) Appl. No.: 12/409,045

(22) Filed: Mar. 23, 2009

(65) Prior Publication Data

US 2009/0237757 A1    Sep. 24, 2009

(30) Foreign Application Priority Data

Mar. 24, 2008  (JP) .................. 2008-076066
Mar. 24, 2008  (JP) .................. 2008-076067

(51) Int. Cl.
*H04N 1/40*  (2006.01)
(52) U.S. Cl. ........................ 358/2.1; 358/468
(58) Field of Classification Search .......... 358/1.9, 358/2.1, 504, 406, 500, 400, 468, 3.1–3.12, 358/3.21
See application file for complete search history.

(56) References Cited

U.S. PATENT DOCUMENTS

| | | | |
|---|---|---|---|
| 6,343,846 B1 * | 2/2002 | Asano | 347/14 |
| 7,266,313 B2 | 9/2007 | Yokoi et al. | |
| 2007/0058188 A1 * | 3/2007 | Nakahara | 358/1.13 |
| 2008/0068628 A1 | 3/2008 | Dokuni | |

FOREIGN PATENT DOCUMENTS

| | | |
|---|---|---|
| JP | 8-287273 | 11/1996 |
| JP | 2000-25274 | 1/2000 |
| JP | 2000-247001 | 9/2000 |
| JP | 2003-125225 | 4/2003 |
| JP | 2004-13025 | 1/2004 |
| JP | 2004-228919 | 8/2004 |

OTHER PUBLICATIONS

Chinese Office Action dated May 5, 2011 and English-language translation thereof.
Chinese Official Action dated May 21, 2010, together with English-language translation.

* cited by examiner

*Primary Examiner* — Thomas D Lee
*Assistant Examiner* — Stephen M Brinich
(74) *Attorney, Agent, or Firm* — Scully, Scott, Murphy & Presser, PC

(57) ABSTRACT

An image-processing system for printing an image based on original image data. The storing unit stores at least one look-up table in association with at least one printing condition. The at least one look-up table is used to convert a color value in original image data into a limited color value that limits a total quantity of ink to be used in printing. The detecting unit detects, as a printing condition, at least one of a type of color material and a type of recording medium which are used for printing operation. The converting unit converts the color value data into the limited color value by using a look-up table that is assigned with a printing condition corresponding to the detected printing condition.

12 Claims, 20 Drawing Sheets

SUBREGION NUMBER
(1, 1)

REFLECTANCE

| PAPER TYPE | INK TYPE | LUT |
|---|---|---|
| (x, y) | ID NUMBER | ADDRESS OF LUT |
| ⋮ | ⋮ | ⋮ |
| ⋮ | ⋮ | ⋮ |
| | | |

INK QUANTITY CONFIRMATION CHART

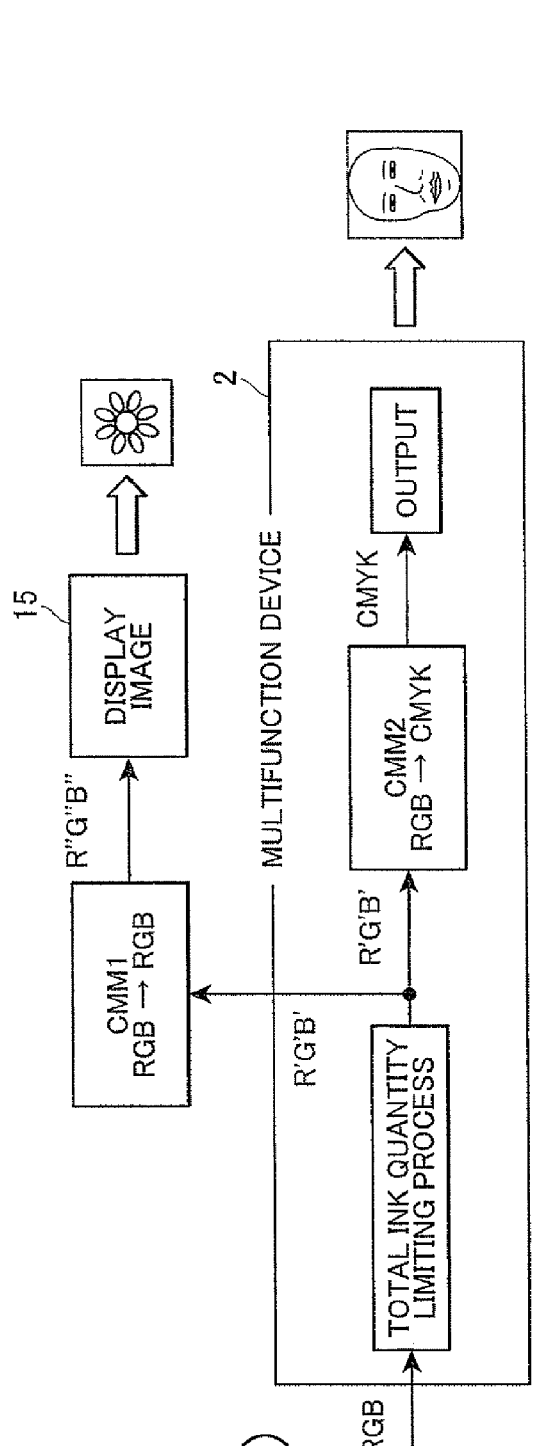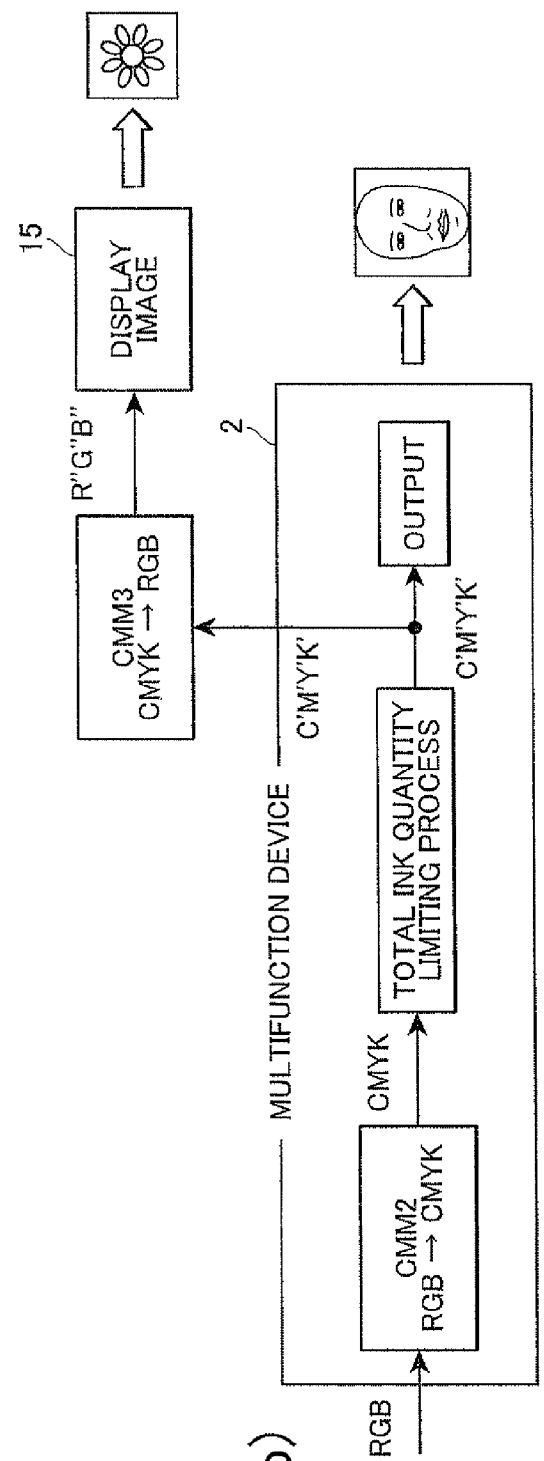

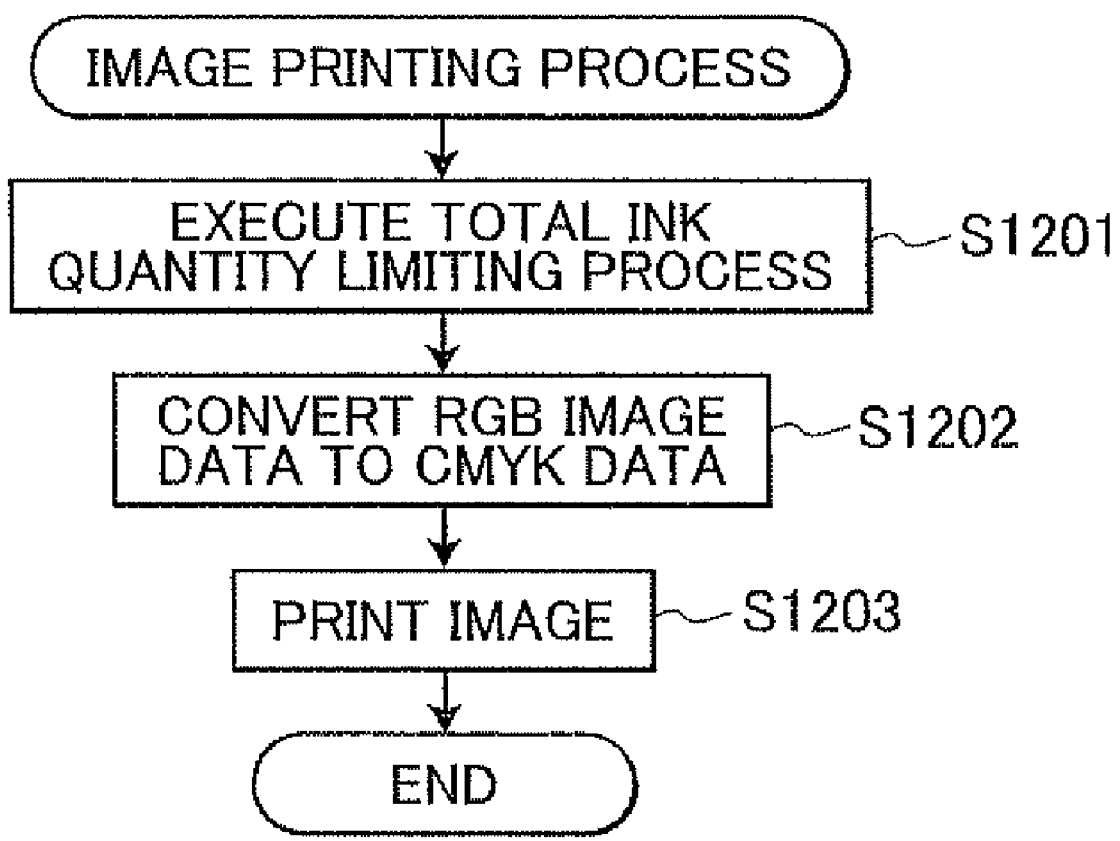

IMAGE-PROCESSING SYSTEM

CROSS REFERENCE TO RELATED APPLICATION

This application claims priority from Japanese Patent Application No. 2008-076066 filed Mar. 24, 2008, and Japanese Patent Application No 2008-076067 filed Mar. 24, 2008. The entire contents of the priority applications are incorporated herein by reference.

TECHNICAL FIELD

The invention relates to an image-processing system for restricting the amount of color material used in printing.

BACKGROUND

One type of printing device well known in the art prints color images using a color material, such as ink or toner, in a plurality of colors, such as cyan, magenta, yellow, and black.

This type of printing device converts image data representing an image to be printed (image data in the RGB color spacer for example) to a color system corresponding to the colors of the color material used in printing (the CMYK color space, for example) and prints the image based on the converted image data. Since colors in an image are rendered by superimposing each color material, satisfactory printing results may not be obtained for some colors when the total amount of color material used to render the color is excessive.

Therefore, techniques have been proposed for printing images by converting image data so as to restrict the total amount of color material used in the printing operation. For example, a multifunction device described in Japanese patent application publication No. 2003-125225 prints an image based on image data in the RGB color space inputted from an input unit by first converting this image data to image data in the CMYK color space corresponding to the colors of the color material. Subsequently, further the multifunction device converts the image data so that the total amount of color material is less than a predetermined limit.

SUMMARY

However, since the limit on color material required for obtaining satisfactory printing results differs according to such printing conditions as the type of color material and the type of printing medium, an amount of color material appropriate for printing under certain printing conditions may be excessive under different printing conditions and, hence, may not always achieve the desired printing results.

In view of the foregoing, it is an object of the invention to provide an image-processing system, an image-processing program, and an image-processing method that performs a process to limit the amount of color materials used in printing based on the printing conditions.

Further, it is also preferable to modify the steps in a color material quantity limiting process to suit printing conditions not envisioned when the printing apparatus was manufactured, for example.

However, the color material quantity limiting process is generally executed based on a program already installed on the printing apparatus. Further, as described above, the well-known color material quantity limiting process is performed after the image data is converted to data of a color system corresponding to the colors of the color material. Accordingly, it is not easy to modify the steps of the color material quantity limiting process after the conversion.

In view of the foregoing, it is also an object of the invention to provide an image-processing system capable of easily modifying steps in the color material quantity limiting process.

In order to attain the above and other objects, the invention provides an image-processing system for printing an image based on original image data having a color value. The image-processing system includes a storing unit, a detecting unit, and a converting unit. The storing unit stores at least one look-up table in association with at least one printing condition. The at least one look-up table is used to convert a color value in original image data into a limited color value that limits a total quantity of ink to be used in printing. The detecting unit detects, as a printing condition, at least one of a type of color material and a type of recording medium which are used for printing operation. The converting unit converts the color value in the original image data into the limited color value by using a look-up table that is assigned with a printing condition corresponding to the detected printing condition.

According to another aspects, the invention provides a computer-readable storage medium storing a set of program instructions executable on a computer that includes a storing unit that stores at least one look-up table in association with at least one printing condition. The at least one look-up table is used to convert a color value in original image data into a limited color value that limits a total quantity of ink to be used in printing. The program instructions includes detecting, as a printing condition, at least one of a type of color material and a type of recording medium which are used for printing operation, and converting the color value in the original image data into the limited color value by using a look-up table that is assigned with a printing condition corresponding to the detected printing condition.

According to still another aspects, the invention provides an image-processing method for controlling an image-processing system that includes a storing unit that stores at least one look-up table in association with at least one printing condition. The at least one look-up table is used to convert a color value in original image data into a limited color value that limits a total quantity of ink to be used in printing. The image-processing method includes detecting, as a printing condition, at least one of a type of color material and a type of recording medium which are used for printing operation, and converting the color value in the original image data into the limited color value by using a look-up table that is assigned with a printing condition corresponding to the detected printing condition.

According to still another aspects, the invention provides an image-processing system for printing an image based on original image data having a color value. The image-processing system includes a creating unit, a converting unit, and a printing data conversion unit. The creating unit creates a look-up table that is used to convert a color value in original image data into a limited color value that limits a total quantity of ink to be used in printing. The converting unit converts the color value in the original image data into the limited color value by using the look-up table. The printing data conversion unit converts the limited color value into a printing color value that specifies a quantity of the color material to be used in printing.

According to still another aspects, the invention provides a computer-readable storage medium storing a set of program instructions executable on a computer. The program instructions includes creating a look-up table that is used to convert a color value in original image data into a limited color value that limits a total quantity of ink to be used in printing, converting the color value in the original image data into the limited color value by using the look-up table, and converting the limited color value into a printing color value that specifies a quantity of the color material to be used in printing.

According to still another aspects, the invention provides an image-processing method. The image-processing method includes creating a look-up table that is used to convert a color value in original image data into a limited color value that limits a total quantity of ink to be used in printing, converting the color value in the original image data into the limited color value by using the look-up table, and converting the limited color value into a printing color value that specifies a quantity of the color material to be used in printing.

BRIEF DESCRIPTION OF THE DRAWINGS

Embodiments in accordance with the invention will be described in detail with reference to the following figures wherein:

FIG. 22($a$) is an explanatory diagram showing a process for displaying a sample image on a display unit;

FIG. 22($b$) is an explanatory diagram showing a comparative process for displaying a sample image on the display unit; and FIG. 23 is a flowchart illustrating steps in an image printing process executed by a multifunction device according to the third embodiment.

DETAILED DESCRIPTION

<First Embodiment>

Next, a first embodiment of the invention will be described while referring to the accompanying drawings.

[Overall Structure of a Communication System 100]

Figure 1:
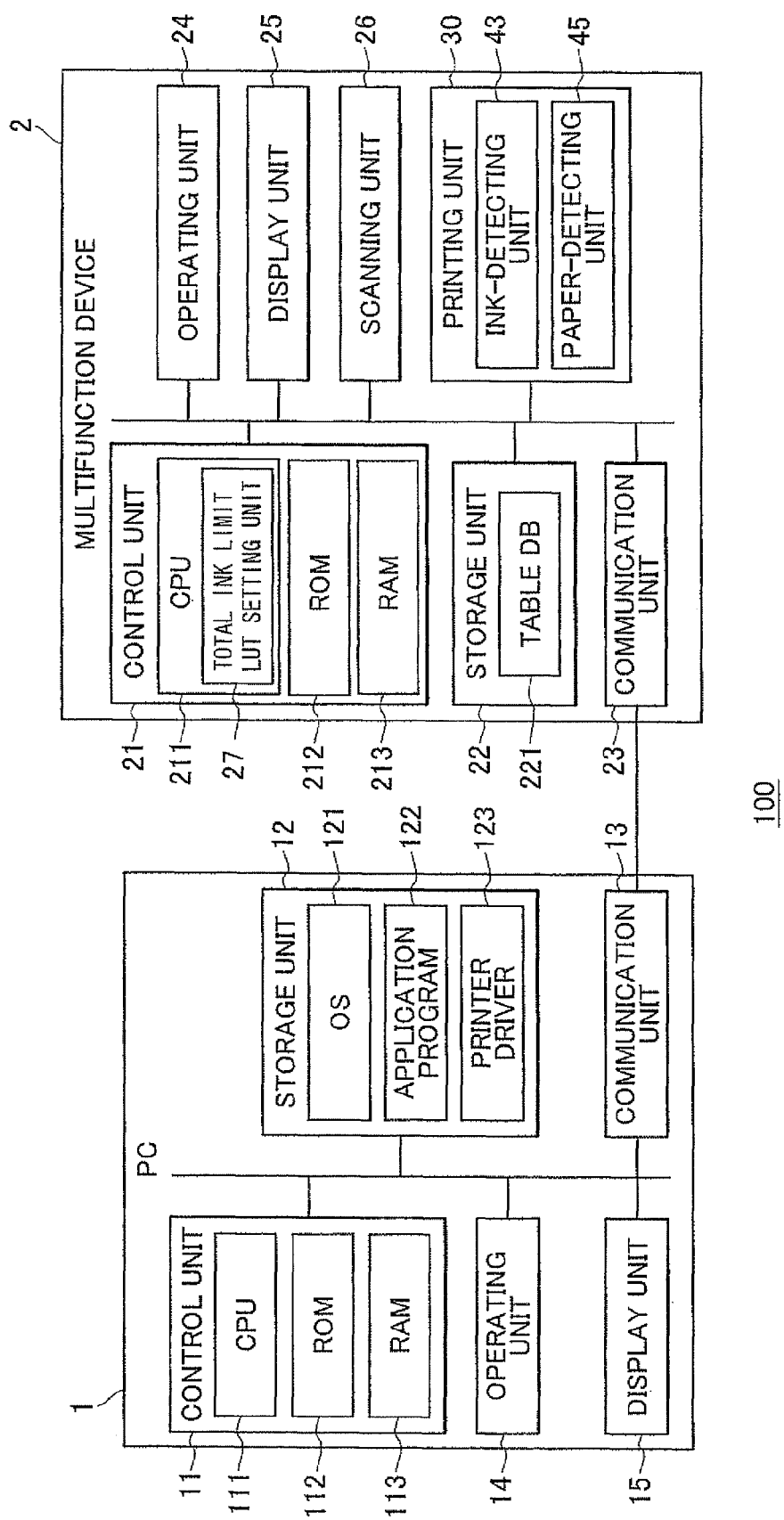
FIG. 1 is a block diagram showing an overall structure of a communication system according to a first embodiment.

FIG. 1 is a block diagram showing the overall structure of a communication system 100 according to the first embodiment. As shown in FIG. 1, the communication system 100 includes a personal computer (PC) 1, and a multifunction device 2. The PC 1 and multifunction device 2 can exchange data through communications over a network. In the embodiment, the network is a local area network (LAN).

The PC 1 is a general-purpose data processor that includes a control unit 11, a storage unit 12, a communication unit 13, an operating unit 14, and a display unit 15.

The control unit 11 includes a CPU 111, a ROM 112, and a RAM 113. The control unit 11 comprehensively controls each unit in the PC 1.

The storage unit 12 stores various data. In the embodiment, a hard disk drive is used as the storage unit 12. Various programs are installed on the storage unit 12, including an operating system (OS) 121, application programs 122 such as an image browsing program, and a printer driver 123 for printing on the multifunction device 2.

The communication unit 13 is an interface that enables communications with the multifunction device 2 over the network. The operating unit 14 is configured of a keyboard and a pointing device, such as a mouse, that enable a user to input commands through external operations.

The display unit 15 displays various data as images that the user can understand. In the embodiment, a liquid crystal display is used as the display unit 15.

The multifunction device 2 is a device having multiple functions, such as a scanner function and a printer function. The multifunction device 2 includes a control unit 21, a storage unit 22, a communication unit 23, an operating unit 24, a display unit 25, a scanning unit 26, and a printing unit 30.

The control unit 21 includes a CPU 211, a ROM 212, and a RAM 213. The control unit 21 comprehensively controls each unit in the multifunction device 2

The storage unit 22 stores various data. In the embodiment, flash memory is used as the storage unit 22. The storage unit 22 stores a table database 221. The table database 221 registers a plurality of total ink limit look-up tables corresponding to various ink types and paper types used in printing (hereinafter, the total ink limit look-up table is abbreviated as "total ink limit LUT"). In other words, the table database 221 stores the plurality of total ink limit look-up tables and stores storage addresses of the plurality of total ink limit LUTs in association with the paper types and the ink types used in printing.

The storage addresses specify addresses of the plurality of total ink limit look-up tables in the table database 221.

The total ink limit LUT is used to convert image data for an image to be printed to image data that limits the total quantity of ink to be used in printing. This conversion is performed in the RGB color space.

Figure 7:
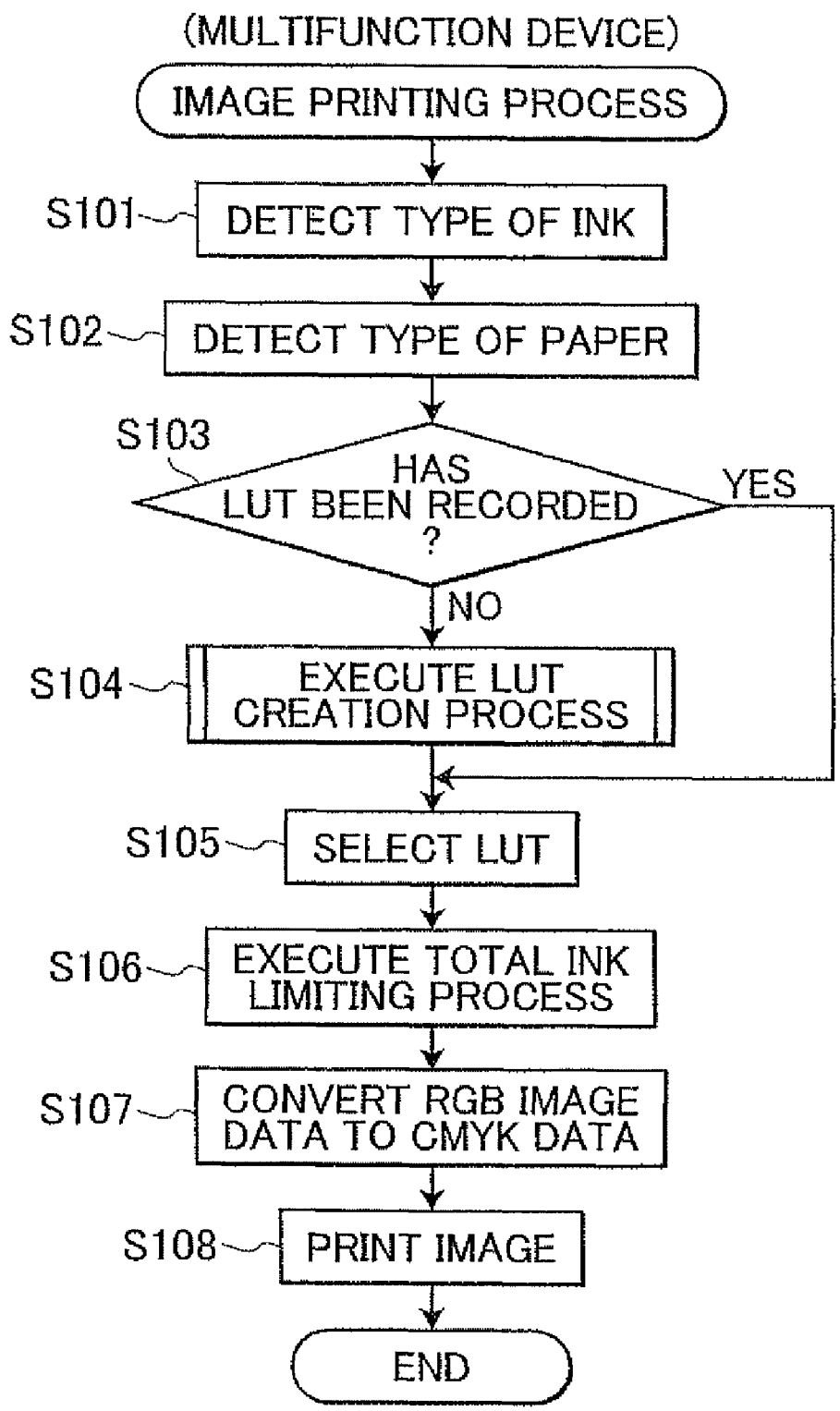
FIG. 7 is a flowchart illustrating steps in an image printing process executed by a control unit of a multifunction device.
Figure 10:
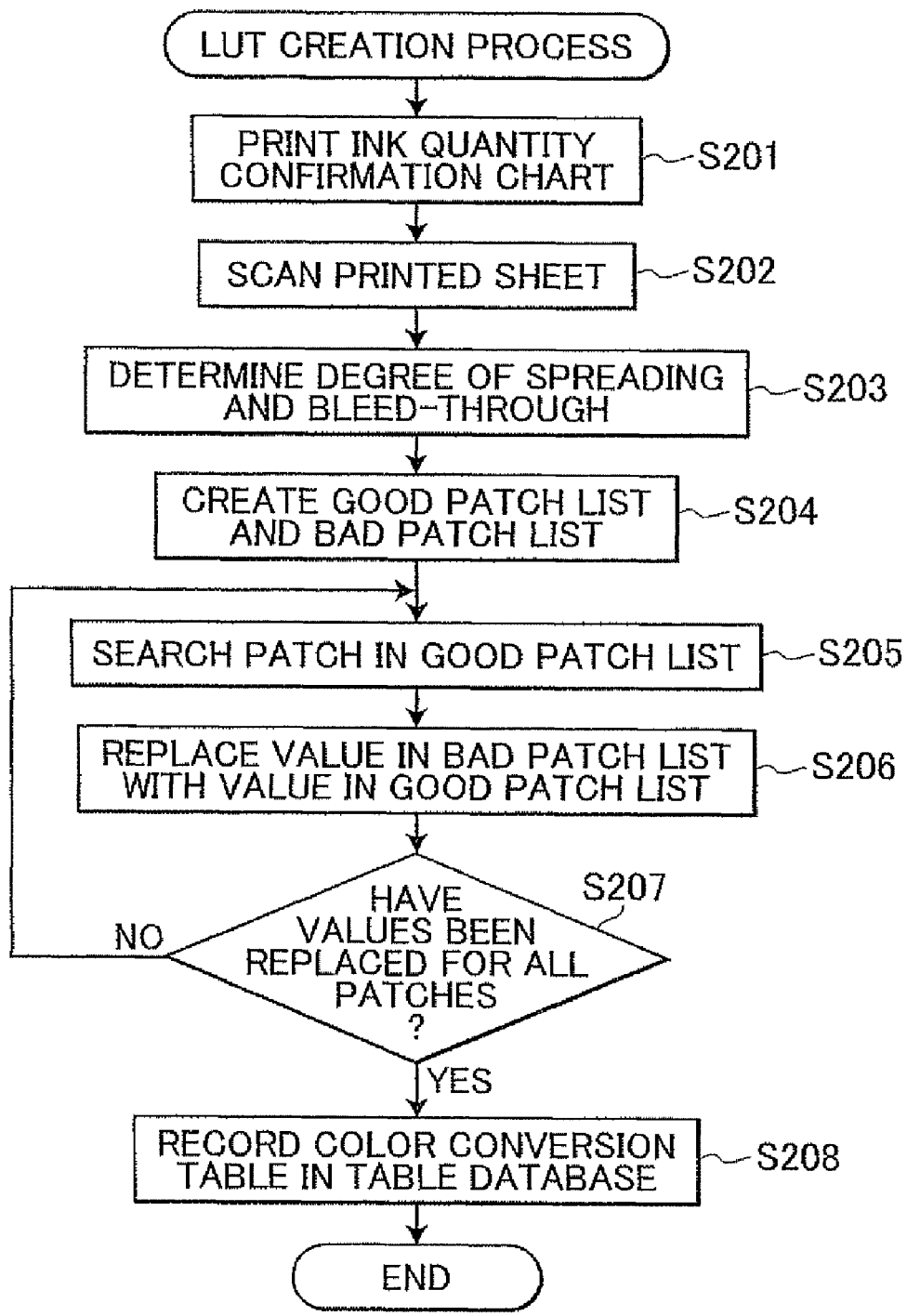
FIG. 10 is a flowchart illustrating steps in a LUT creation process executed by the multifunction device according to the first embodiment.

The storage unit 22 also stores programs that instruct the CPU 211 to execute processes described later with reference to FIGS. 7 and 10.

The communication unit 23 is an interface for implementing communications with the PC 1 over the network. The operating unit 24 includes various operating buttons that enable a user to input commands through external operations.

The display unit 25 functions to display message data and the like as text and images that can be understood by the user. A small liquid crystal display is used as the display unit 25 in the embodiment. The scanning unit 26 reads images from an original document set at a prescribed document-reading position and generates image data for rendering this image (image data in the RGB color space in the embodiment).

The printing unit 30 is an inkjet system that prints color images by ejecting ink droplets in the colors cyan (C), magenta (M), yellow, (Y), and black (K) onto paper or another printing medium. The printing unit 30 also includes an ink-detecting unit 43 for detecting the type of ink used in printing, and a paper-detecting unit 45 for optically detecting the type of paper used in printing.

Figure 2:
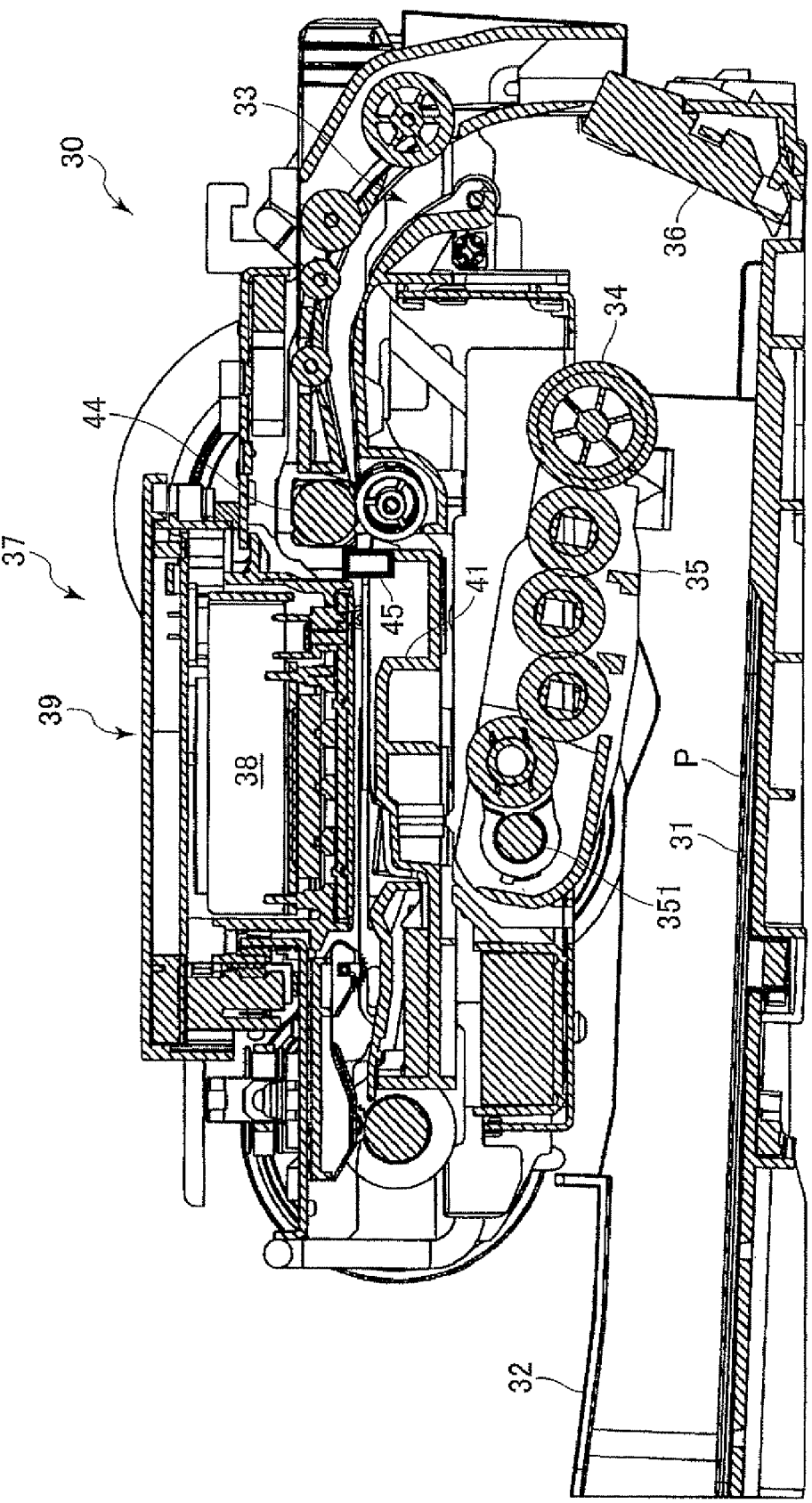
FIG. 2 is a cross-sectional view showing a primary structure of a printing unit.

Next, the structure of the printing unit 30 will be described. FIG. 2 is a cross-sectional view showing the primary structure of the printing unit 30. The printing unit 30 is disposed in the bottom section of the multifunction device 2, while the scanning unit 26 is disposed in the top section.

As shown in FIG. 2, the printing unit 30 includes a feeding cassette 31 accommodating sheets of paper P. The sheets of paper P are supplied from the feeding cassette 31 into the printing unit 30, printed with desired images, and subsequently discharged onto a discharge tray 32.

More specifically, a feeding roller 34 is disposed above the feeding cassette 31 for supplying the paper P accommodated in the feeding cassette 31 onto a paper-conveying path 33 one sheet at a time. The shaft of the feeding roller 34 is supported in a distal end of a feeding arm 35. The distal end of the feeding arm 35 pivots up and down about a base shaft 351.

The feeding arm 35 is urged to rotate downward toward the feeding cassette 31 either by its own weight or the urging of a spring or the like so that the feeding roller 34 rotatably supported on the distal end of the feeding arm 35 is pressed against the top surface of the sheets of paper P stacked in the feeding cassette 31. By rotating the feeding roller 34 in this state, a frictional force is generated between the surface of the feeding roller 34 and the topmost sheet of paper P, and the topmost sheet of paper P is conveyed toward a sloped separating plate 36. The leading edge of the sheet contacts the separating plate 36 and is guided upward thereby, entering the paper-conveying path 33.

An image-recording unit 37 is disposed on the paper-conveying path 33. The image-recording unit 37 includes a carriage 39 capable of reciprocating in a main scanning direction, and an inkjet recording head 38 supported in the carriage 39. Ink cartridges 40 (see FIG. 3) are provided in the printing unit 30 independently of the inkjet recording head 38 for supplying ink in the colors cyan, magenta, yellow, and black to the inkjet recording head 38 via ink tubes. The inkjet recording head 38 ejects ink in these colors as microdroplets. A platen 41 is disposed along the paper-conveying path 33 beneath the reciprocating carriage 39. As a sheet of paper P is conveyed over the platen 41, the carriage 39 reciprocates and the inkjet recording head 38 ejects ink droplets to form images on the paper P.

Figure 3:
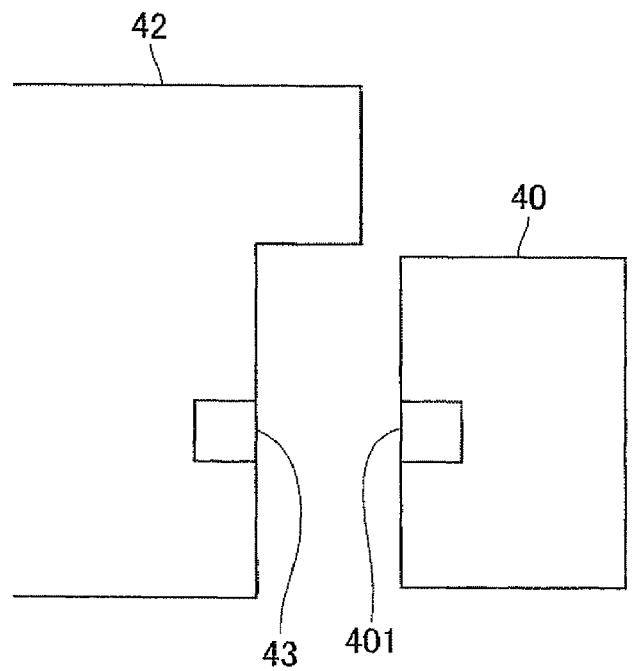
FIG. 3 is an explanatory diagram showing an ink cartridge.

As shown in FIG. 3, the ink cartridges 40 are detachably mounted in an ink cartridge mounting unit 42 provided in the body of the multifunction device 2. Each ink cartridge 40 has an IC chip 401 provided on a side mounting surface of the ink cartridge 40. The IC chip 401 stores an ID number specifying the type of ink used in the ink cartridge. The IC chip 401 is electrically connected to the ink-detecting unit 43 (IC reader) provided on the ink cartridge mounting unit 42 when the ink cartridge 40 is mounted in the ink cartridge mounting unit 42.

Figure 4:
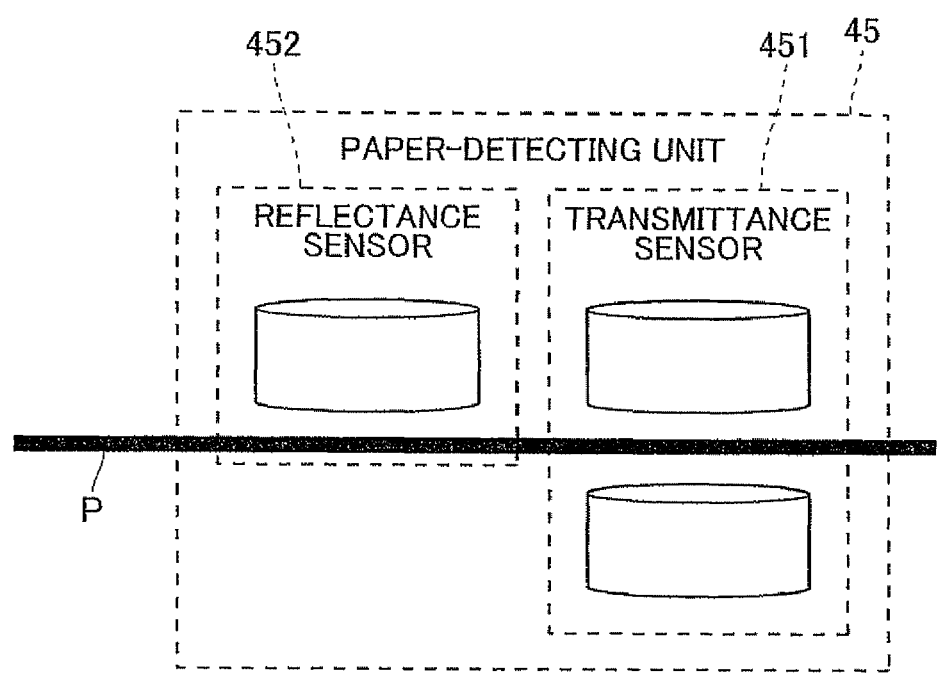
FIG. 4 is an explanatory diagram illustrating a structure of a paper-detecting unit.

As shown in FIG. 2, a conveying roller 44 is disposed upstream of the platen 41 in the paper-conveying direction for conveying sheets of the paper P along the bottom surface of the inkjet recording head 38. The paper-detecting unit 45 is disposed on the downstream side of the conveying roller 44 (upstream side of the inkjet recording head 38). More specifically, as shown in FIG. 4, the paper-detecting unit 45 is configured of a transmittance sensor 451 for measuring the transmittance of light irradiated onto the sheet, that is, for measuring the thickness of the paper, and a reflectance sensor 452 for measuring the reflectance of light irradiated on the sheet.

[Overview of Processes Executed on the Communication System 100]

Next, an overview of processes executed on the communication system 100 according to the first embodiment will be described.

Figure 5:
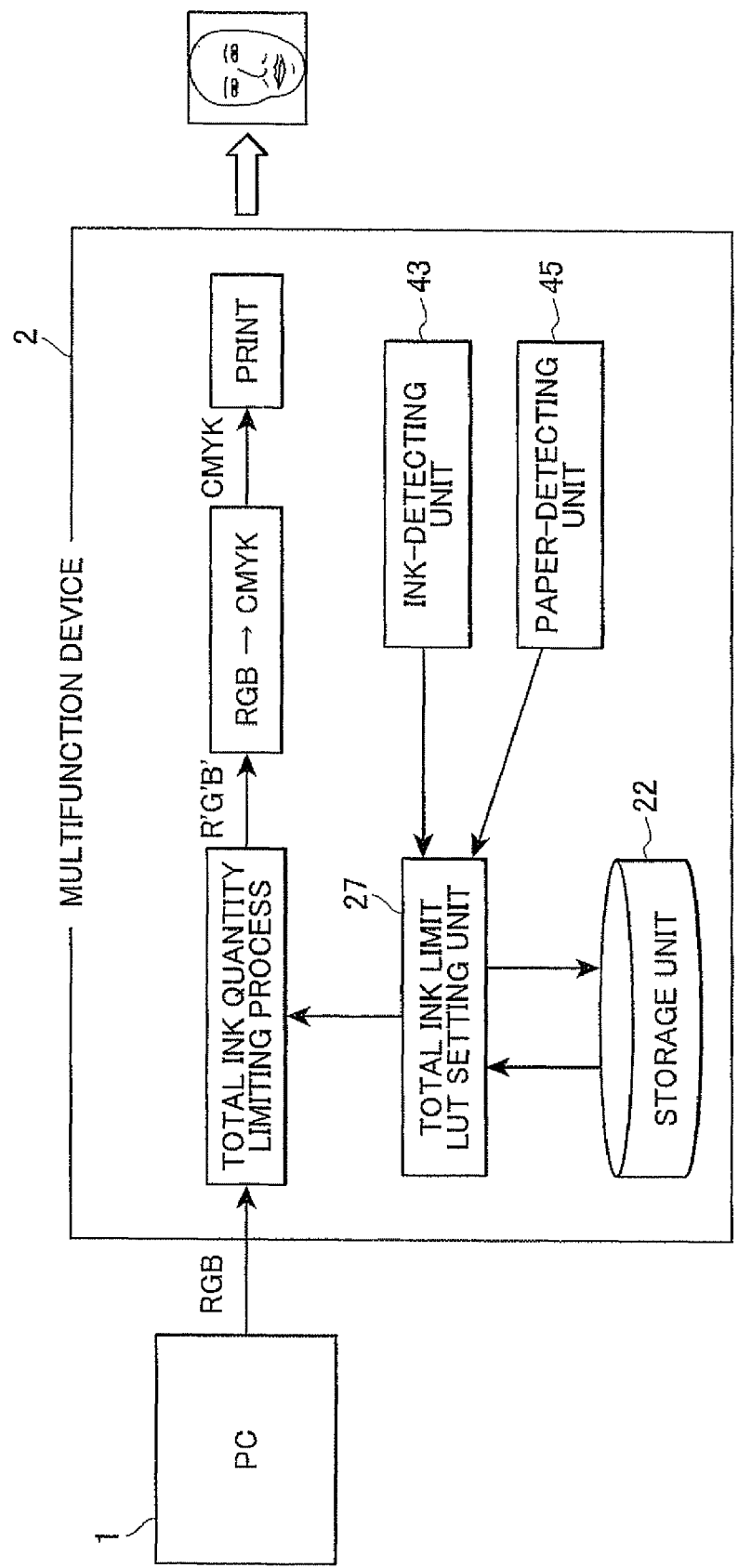
FIG. 5 is a block diagram illustrating processes executed by the communication system according to the first embodiment.

As shown in FIG. 5, the PC 1 issues a print instruction by transmitting image data representing an image to be printed in the RGB color space to the multifunction device 2. When the multifunction device 2 receives a print instruction from the PC 1, the multifunction device 2 performs a process to limit the total quantity of ink used in the printing operation. In this total ink quantity limiting process, the multifunction device 2 converts the image data (RGB data) received from the PC 1 to image data (R'G'B' data that is represented in the RGB color space) restricting the total quantity of ink to be used in the printing operation. Next, the multifunction device 2 converts the resulting image data (R'G'B' data) represented in the RGB color space to corresponding image data represented in the CMYK color space and prints an image based on the CMYK image data.

Here, the total ink quantity limiting process serves to convert image data in order to limit the total quantity of ink used in printing by employing a total ink limit LUT corresponding to the type of ink and the type of paper being used.

As described earlier, the storage unit 22 of the multifunction device 2 stores the table database 221 in which a plurality of total ink limit LUTs is recorded. The plurality of total ink limit LUTs is used for converting RGB image data for an image to be printed into RGB image data restricting the total quantity of ink to be used in the printing operation. That is, the total ink limit LUT has a plurality of sets of RGB values for input data (hereinafter, referred as input RGB values) in association with a plurality of sets of RGB values for out put data (hereinafter, referred as output RGB values). The control unit 21 of the multifunction device 2 functions as a total ink limit LUT setting unit 27 for selecting the total ink limit LUT, from the table database 221, that corresponds to the types of ink and paper detected by the ink-detecting unit 43 and the paper-detecting unit 45 respectively. The selected total ink limit LUT is then used in the total ink quantity limiting process.

Figure 6:
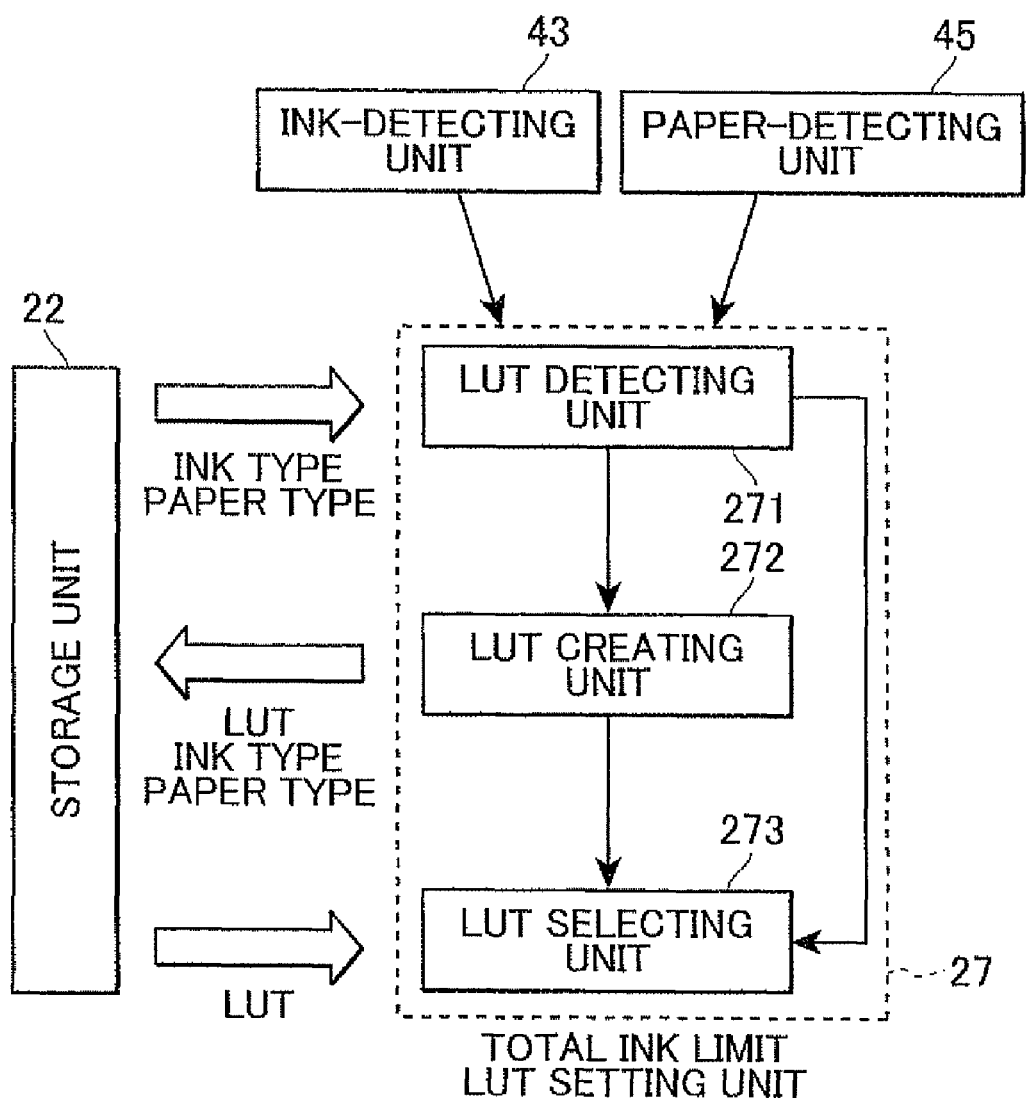
FIG. 6 is a block diagram showing the structure of a total ink limit LUT setting unit.

As shown in FIG. 6, the total ink limit LUT setting unit 27 includes an LUT detecting unit 271, an LUT creating unit 272, and an LUT selecting unit 273.

The LUT detecting unit 271 determines whether a total ink limit LUT corresponding to the types of ink and paper detected by the ink-detecting unit 43 and the paper-detecting unit 45 has been recorded in the table database 221 of the storage unit 22.

If the LUT detecting unit 271 determines that the table database 221 stores a total ink limit LUT associated with the detected types of ink and paper, the LUT selecting unit 273 selects this total ink limit LUT.

However, if the LUT detecting unit 271 does not find a total ink limit LUT recorded for the detected types of ink and paper, the LUT creating unit 272 creates a new total ink limit LUT corresponding to the detected types of ink and paper and records this new total ink limit LUT in the table database 221 of the storage unit 22 in association with the detected types of ink and paper. Subsequently, the LUT selecting unit 273 selects this newly created total ink limit LUT.

[Process Implemented on the Multifunction Device 2]

Next, the process implemented on the multifunction device 2 will be described in detail. FIG. 7 is a flowchart illustrating steps in an image printing process executed by the control unit 21 (and more specifically the CPU 211) of the multifunction device 2 when the multifunction device 2 receives a print instruction from the PC 1.

In S101 at the beginning of the image printing process, the control unit 21 detects the type of ink used for printing. Specifically, the ink-detecting unit 43 reads the ID number stored in the IC chip 401 of the ink cartridge 40, and the control unit 21 identifies the type of ink from this ID number.

Figures 8, 9:
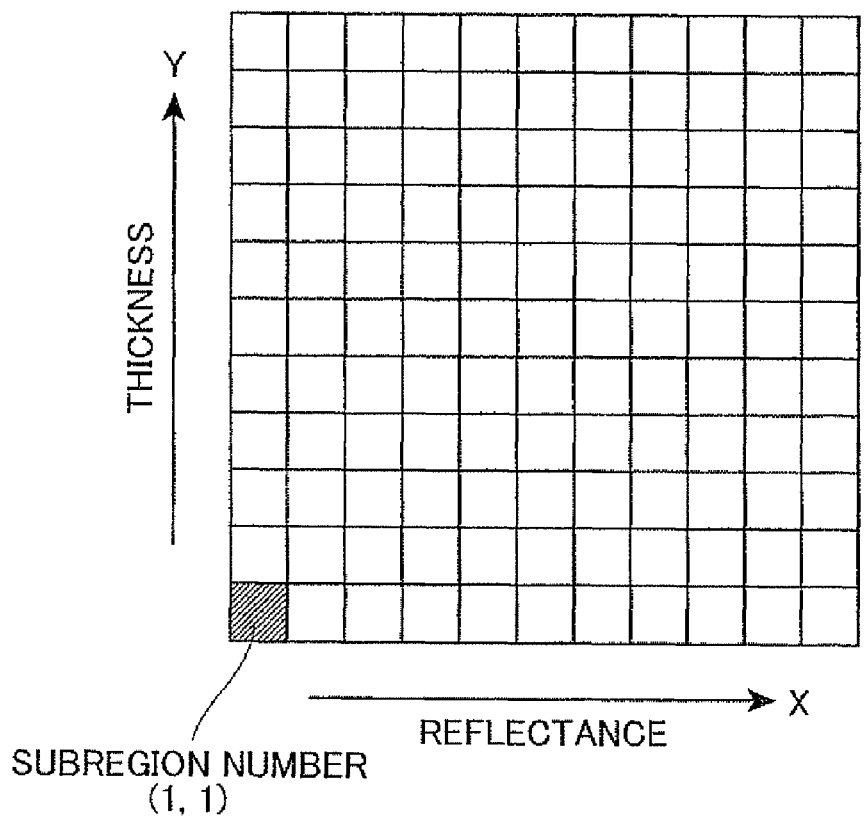
FIG. 8 is an explanatory diagram illustrating a method of identifying the paper type.
FIG. 9 is an explanatory diagram illustrating a method of identifying a total ink limit LUT corresponding to types of ink and paper.

In S102 the control unit 21 detects the type of paper used in printing. More specifically, as shown in FIG. 8, the two-dimensional region of a graph whose X-axis represents the reflectance of paper and whose Y-axis represents the thickness of paper is divided into a plurality of subregions. Each subregion is preassigned a number. The control unit 21 then identifies the type of paper from the number (for example, (1, 1)) assigned to the subregion corresponding to the paper thickness measured by the transmittance sensor 451 of the paper-detecting unit 45 (light transmittance) and the paper reflectance measured by the reflectance sensor 452.

In S103 the control unit 21 (LUT detecting unit 271) determines whether a total ink limit LUT associated with the types of ink and paper detected in S101 and S102 has been recorded in the table database 221. More specifically, as shown in FIG. 9, the control unit 21 determines whether the storage address of a total ink limit LUT has been stored in association with the detected paper type (subregion number) and ink type (ID number of the ink cartridge 40). To achieve this, in S103 the control unit 21 searches the table database 221 for a total ink limit LUT associated with the types of ink (ID number of the ink cartridge 40) and paper (subregion number) detected in S101 and S102.

If in S103 the control unit 21 determines that a corresponding total ink limit LUT has not been recorded, in S104 the control unit 21 (LUT creating unit 272) executes an LUT creation process to create a new total ink limit LUT corresponding to the detected types of ink and paper, and subsequently advances to S105. The LUT creation process will be described later in detail with reference to FIG. 10.

However, if in S103 the control unit 21 determines that a total ink limit LUT corresponding to the detected types of ink and paper has been recorded, the control unit 21 skips S104 and advances directly to S105.

In S105 the control unit 21 (LUT selecting unit 273) selects the total ink limit LUT corresponding to the detected types of ink and paper. If the LUT creation process has been executed in S104, in s105 the control unit 21 selects the total ink limit LUT newly created in S104.

In S106 the control unit 21 performs a total ink limiting process on the RGB image data received from the PC 1 using the total ink limit LUT selected in S105. That is, the control unit 21 searches from the total ink limit LUT, input RGB values corresponding to RGB values in the RGB image data for each pixel (hereinafter, referred as target RGB values). If the input RGB values corresponding to the target RGB values are found from the total ink limit LUT, the control unit 21 replaces the target RGB values by the output RGB values that is assigned with the found input RGB values in the total ink limit LUT. If the input RGB values corresponding to the target RGB values are not found from the total ink limit LUT, the control unit 21 searches and obtains the input RGB values that are nearest values of the target RGB values from the total ink limit LUT. Subsequently, the control unit 21 replaces the target RGB values by the output RGB values that are assigned with the obtained input RGB values in the total ink limit LUT. Alternatively, if the input RGB values corresponding to the target RGB values are not found from the total ink limit LUT, the control unit 21 searches and obtains a plurality of sets of the input RGB values that are neighboring to the target RGB values from the total ink limit LUT. The control unit 21 calculates an interpolated RGB values that is obtained by an interpolation approximation using the plurality sets of the output RGB values corresponding to the obtained plurality of sets of the input RGB values. Subsequently, the control unit 21 replaces the target RGB values by the interpolated RGB values.

In S107 the control unit 21 converts the RGB image data produced from the process in S106 to CMYK data. In S108 the control unit 21 performs a process to print images based on the CMYK data produced in the process of S107. Subsequently, the image printing process ends.

Next, the LUT creation process implemented in S104 of the image printing process described above will be described in detail with reference to the flowchart in FIG. 10.

Figure 11:
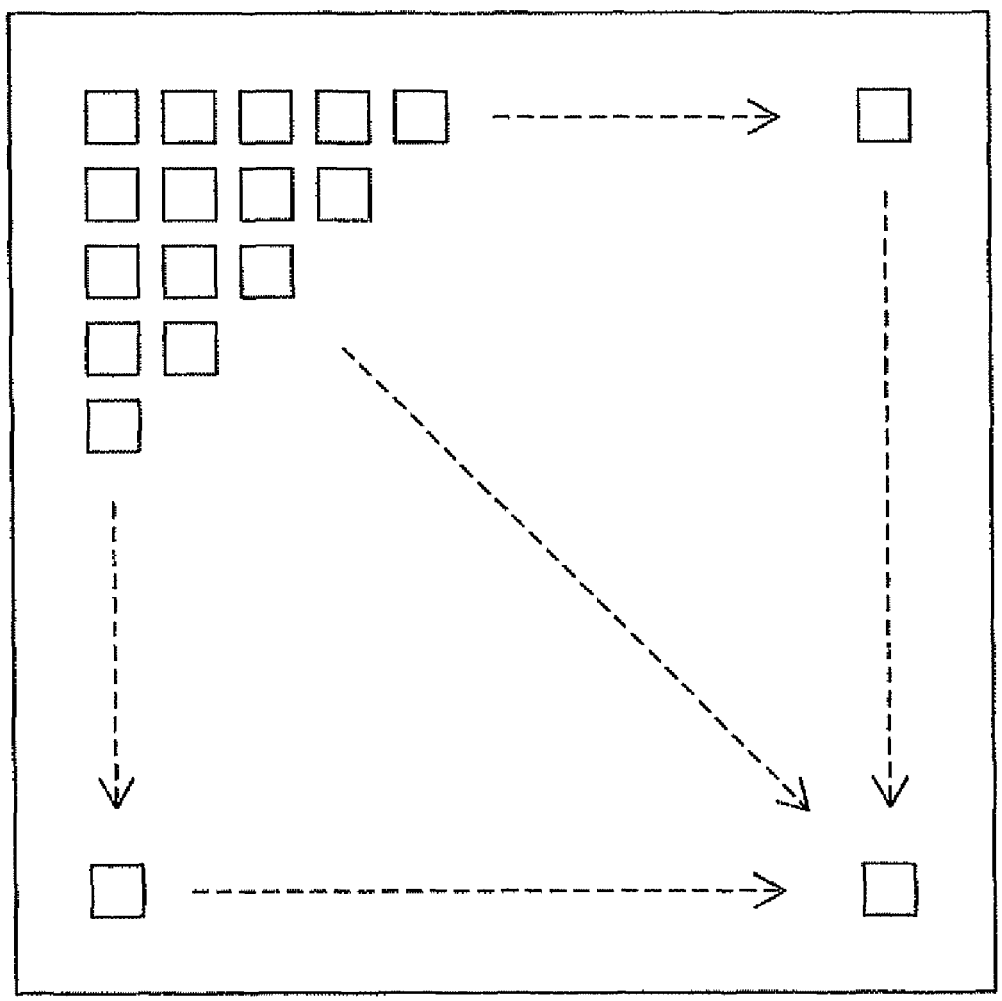
FIG. 11 is an explanatory diagram showing an ink quantity confirmation chart.

In S201 at the beginning of the LUT creation process, the control unit 21 performs a process to print an ink quantity confirmation chart on paper for confirming the quantity of ink printed on the paper. Specifically, as shown in FIG. 11, 729 color patches are printed on paper for combinations of RGB values from (0, 0, 0) to (255, 255, 255), with each value being varied in nine steps. That is, the ink quantity confirmation chart is printed based on chart image data having a plurality of sets of RGB values (for example, (0, 0, 0)). The patches are printed with space therebetween in order to detect the degree of spreading, that is, the phenomenon of ink expanding outward in the printed surface, and bleed-through, that is, the phenomenon B of ink penetrating the paper and appearing on the underside surface of the paper.

In S202 the scanning unit 26 scans both surfaces (the printed surface and back surface) of the sheet on which the ink quantity confirmation chart has been printed in S201. To accomplish this process, the control unit 21 displays a message on the display unit 25 prompting the user to perform the scanning operation.

In S203 the control unit 21 determines the degree of spreading for each patch based on the scanned image of the printed surface, and determines the degree of bleed-through for each patch based on the scanned image of the back surface.

In S204 the control unit 21 creates a good patch list including patches found in S203 to have a satisfactory degree of spreading and bleed-through, and a bad patch list including the remaining patches found in S203 to be unsatisfactory. The good patch list includes identification information specifying good patches (for example, patch numbers) and RGB values used in S201 corresponding to the good patches. Similarly, the bad patch list includes identification information specifying bad patches and RGB values used in S201 corresponding to the bad patches. At this time, the control unit 21 calculates color values (YCrCb values in the embodiment) expressed by the lightness, the saturation, and the hue from the RGB values for each patch used in S201 and correlates these color values with the RGB values.

In S205 the control unit 21 selects one of the patches to be processed from the bad patch list and searches the good patch list for a patch whose YCrCb values are nearest the YCrCb values of the bad patch. That is, the control unit 21 computes the color difference ΔE between the YCrCb values of the bad patch $(Y_b Cr_b Cb_b)$ and the YCrCb values of the good patch $(Y_g Cr_g Cb_g)$ based on Equation (1) below. In Equation (1), a, b, and c are weighting coefficients and may be adjusted to perform a search biased toward lightness (increase the a value) or a search biased toward saturation (decrease the a value), for example.

$$\Delta E = \sqrt{a(Y_g - Y_b)^2 + b(Cr_g - Cr_b)^2 + c(Cb_g - Cb_b)^2} \quad \text{Equation (1)}$$

More specifically, the control unit 21 calculates the color differences ΔE for all the $Y_g Cr_g Cb_g$ values of the good patch with respect to the selected $Y_b Cr_b Cb_b$ of the bad patch. The control unit 21 finds a smallest color difference ΔE that has a smallest value among the calculated color differences ΔE. The control unit 21 also finds a good patch whose $Y_g Cr_g Cb_g$ values are used to obtain the smallest color difference ΔE, as the patch whose YCrCb values are nearest the YCrCb values of the bad patch. The process of S205-S207 is repeatedly performed until completed for all patches in the bad patch list while selecting in S205 a patch that has not yet been processed.

In S206 the control unit 21 replaces the RGB values in the bad patch list with the RGB values found in the good patch list.

In S207 the control unit 21 determines whether the RGB values have been replaced for all patches in the bad patch list (whether the above replacement process has been performed for all patches). The control unit 21 returns to S205 upon determining in S207 that there remain unprocessed patches.

When in S207 the control unit 21 determines that RGB values have been replaced for all patches in the bad patch list, in S208 the control unit 21 (LUT creating unit 273) creates a color conversion table for converting input RGB values to output RGB values and records this color conversion table in the table database 221 of the storage unit 22 as a total ink limit LUT. More specifically, the control unit 21 creates a color conversion table by setting RGB values used in S201 for each patch in the ink quantity confirmation chart as input RGB values and RGB values in the good patch list or the bad patch list as output RGB values. Hence, the color conversion table does not change input RGB values that have been sorted into the good patch, but converts only input RGB values that have been sorted into the bad patch list to RGB values of patches in the good patch list (RGB values of good patches having the smallest difference in YCrCb values from those of the bad patch) based on the replacement process performed in S206. Subsequently, the control unit 21 ends the LUT creation process.

[Effects]

In the communication system 100 according to the first embodiment described above, a plurality of total ink limit LUTs suited to different types of ink and paper used in printing are stored on the multifunction device 2 in advance (see FIG. 1). The multifunction device 2 detects the types of ink and paper to be used for printing as printing conditions (S101, S102) and performs a process to limit the quantity of ink used in printing by converting the image data using the total ink limit LUT corresponding to the printing conditions (S105, S106).

The multifunction device 2 described above can suitably limit the quantity of ink based on the type of ink and type of paper, thereby achieving satisfactory printing results. This method also avoids such problems as the multifunction device 2 ejecting a quantity of ink that exceeds the upper limit of ink absorbency in the paper, whereby non-absorbed ink can become deposited inside the multifunction device 2 and shorten the life of the multifunction device 2.

Since the multifunction device 2 can limit the total ink quantity using a lookup table (total ink limit LUT), complex restrictions based on combinations of ink can be accomplished easily, reducing the computational load on the multifunction device 2.

Further, the multifunction device 2 creates a total ink limit LUT corresponding to the printing conditions (S104) when such a total ink limit LUT has not been stored (s103: NO). Thus, the multifunction device 2 can perform an appropriate process to limit the total ink quantity when unexpected ink or paper is used in printing. For example, unforeseen types of paper and ink may be newly developed after the printing device (the multifunction device 2 in the embodiment) has been manufactured. In addition to specialty printing paper and specialty printing ink, there is also a wide variety of all-purpose paper and refilled ink cartridges in circulation and an increasing number of users are making use of these products. Accordingly, it is very useful to be able to create new total ink limit LUTs suited to new printing conditions.

Further, the multifunction device 2 creates a total ink limit LUT by replacing values in the bad patch list with values from the good patch list based on the results of printing color patches. Accordingly, the multifunction device 2 can easily create a total ink limit LUT capable of achieving satisfactory printing results while preventing a drop in printing quality caused by using an excessive amount of ink.

Figure 18:
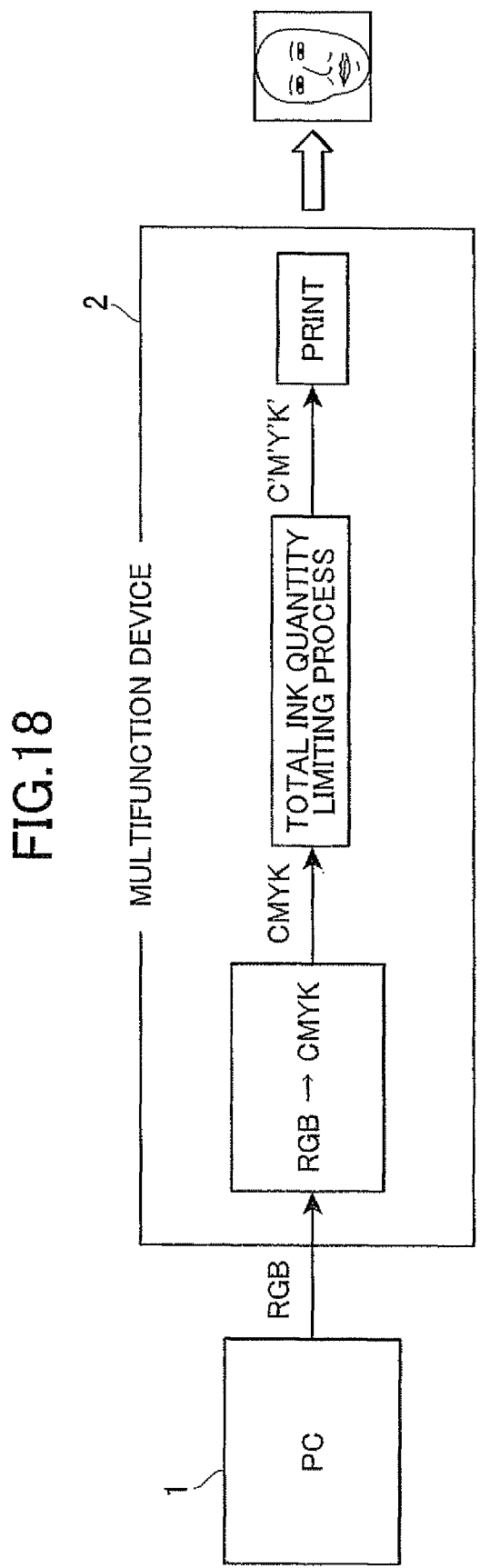
FIG. 18 is a block diagram showing a comparative example in which the total ink quantity limiting process is executed after RGB data is converted to CMYK data.

The multifunction device 2 also performs the total ink quantity limiting process on three-dimensional RGB data prior to converting this data to four-dimensional CMYK data corresponding to the colors of ink used in printing. Accordingly, the multifunction device 2 can use a smaller total ink limit LUT than when performing the total ink quantity limiting process after converting the data to CMYK data, as illustrated in FIG. 18, thereby reducing the amount of required memory and improving processing speed.

<Second Embodiment>

Next, a second embodiment of the invention will be described.

[Overall Structure of a Communication System 200]

Figure 12:
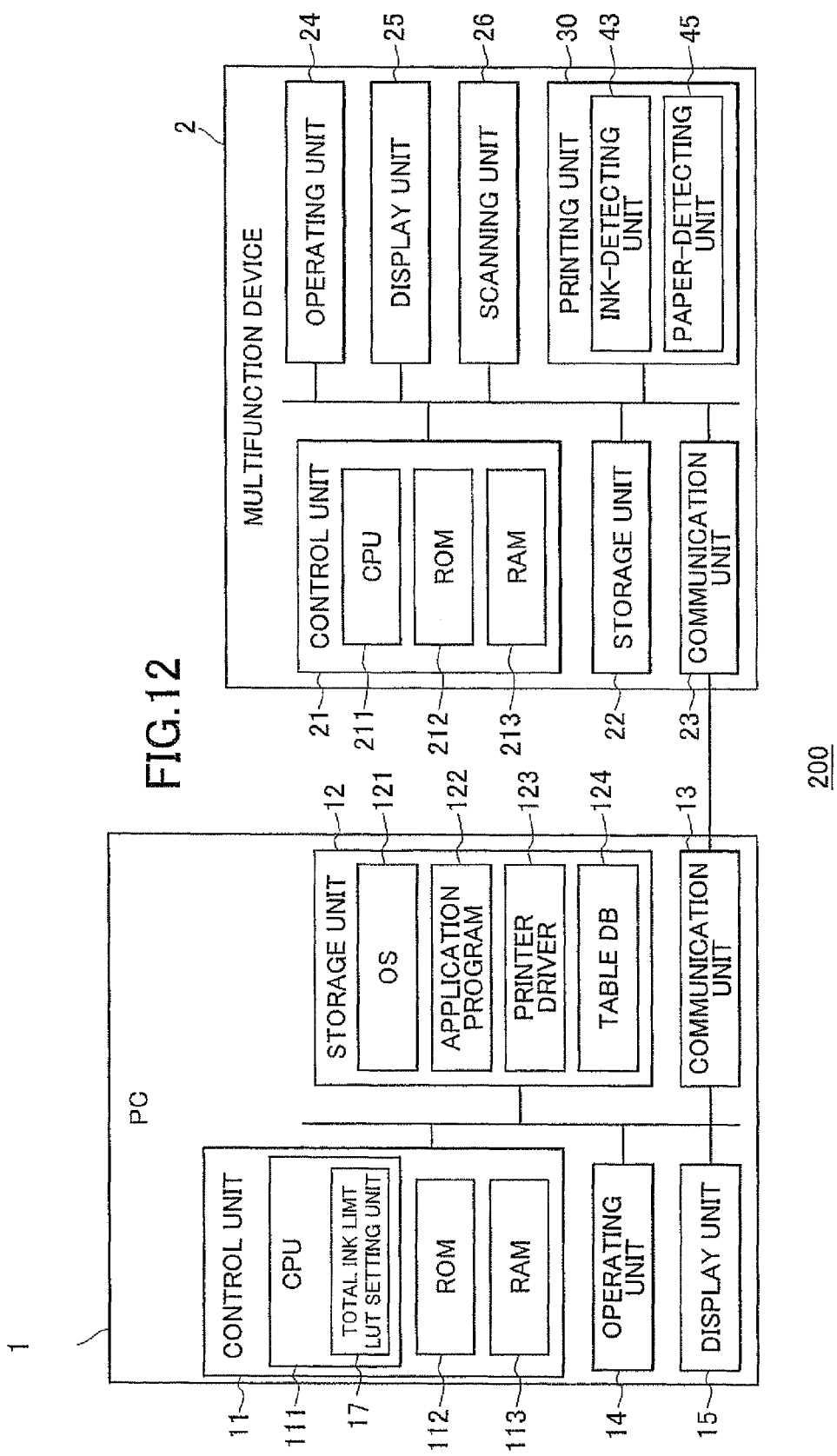
FIG. 12 is a block diagram illustrating an overall structure of a communication system according to a second embodiment.

FIG. 12 is a block diagram illustrating the general structure of a communication system 200 according to the second embodiment.

The following description of the second embodiment will focus on points of difference from the first embodiment, wherein like parts and components are designated with the same reference numerals to avoid duplicating description. As shown in FIG. 12, the communication system 200 according to the second embodiment differs from the communication system 100 according to the first embodiment in that the CPU 211 of the multifunction device 2 does not includes the total ink limit LUT setting unit 27 but the CPU ill includes the total ink limit LUT setting unit 17. Further, the communication system 200 differs from the communication system 100 in that the total ink limit LUTs are stored on the PC 1 rather than the multifunction device 2. Specifically, a table database 124 in which is recorded a plurality of total ink limit LUTs corresponding to various types of ink and paper used for printing is stored in the storage unit 12 of the PC 1. The storage unit 12 also stores programs for instructing the CPU 111 to implement processes described later with reference to FIGS. 14 and 15.

Further, in the communication system 200 according to the second embodiment, a portion of the process implemented by the multifunction device 2 in the first embodiment is executed on the PC 1.

[Overview of the Process Implemented by the Communication System]

Figure 13:
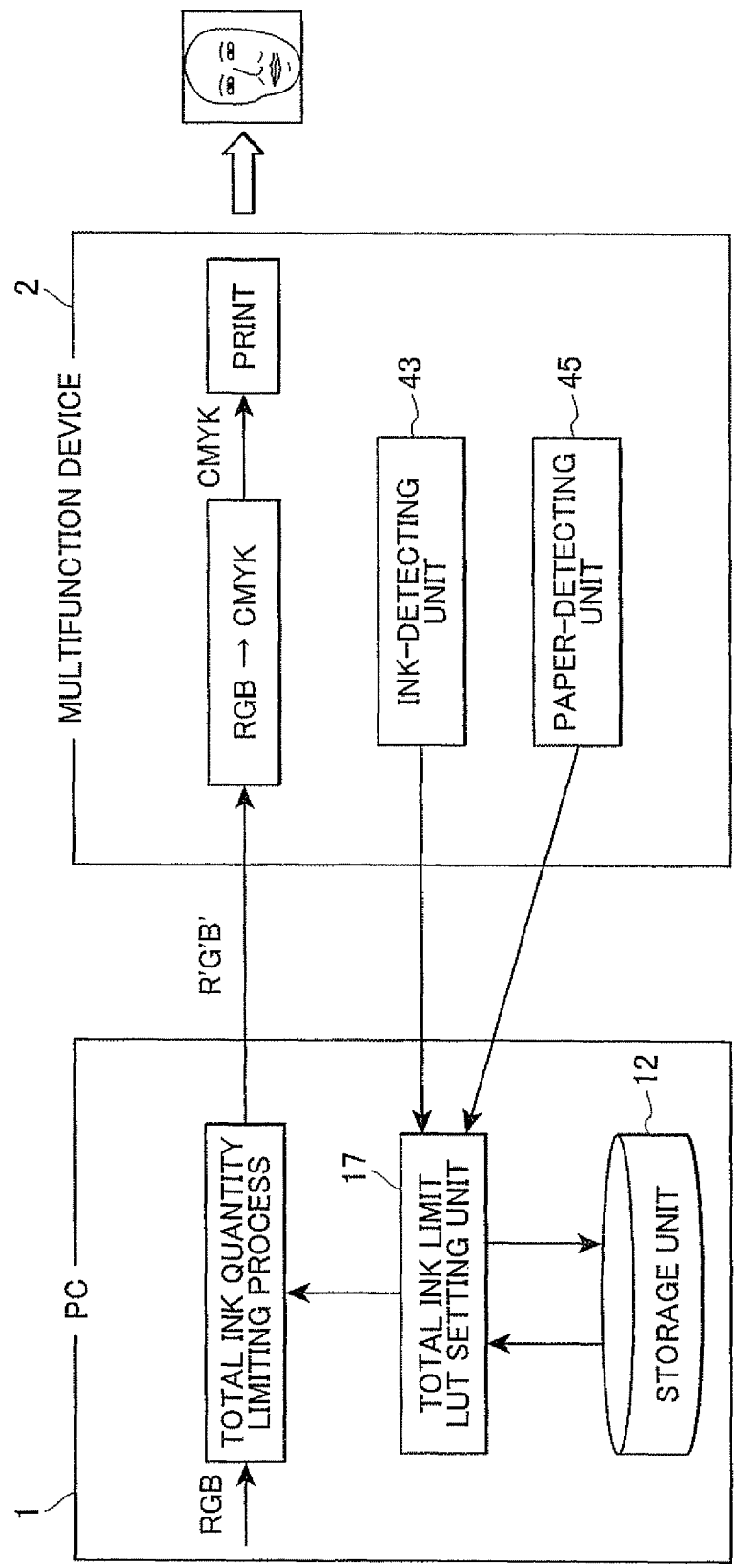
FIG. 13 is a block diagram illustrating processes executed by the communication system according to the second embodiment.

First, an overview of the process implemented on the communication system 200 according to the second embodiment will be described. As shown in FIG. 13, the PC 1 performs a total ink quantity limiting process to convert image data (RGB data) in the RGB color space representing an image to be printed to image data (R'G'B' data in RGB color space) restricting the total quantity of ink to be used in the printing operation. Next, the PC 1 issues a print instruction by transmitting the converted image data (R'G'B' data) in the RGB color space to the multifunction device 2. Upon receiving the print instruction from the PC 1, the multifunction device 2 converts the RGB image data to image data in the CMYK color space corresponding to the colors of ink used in the printing operation and prints an image based on the CMYK image data.

As in the first embodiment, the total ink quantity limiting process serves to convert image data in order to limit the total quantity of ink used in printing by employing a total ink limit LUT corresponding to the type of ink and the type of paper being used.

As described above, the storage unit 12 in the PC 1 stores the table database 124 in which a plurality of total ink limit LUTs is recorded. The plurality of total ink limit LUTs is used for converting RGB image data expressing an image to be printed into RGB image data restricting the total quantity of ink to be used in the printing operation. The ink-detecting unit 43 and the paper-detecting unit 45 in the multifunction device 2 detect the types of ink and paper to be used for printing and the multifunction device 2 notifies the PC 1 of the detection results.

The control unit 11 of the PC 1 functions as a total ink limit LUT setting unit 17 for selecting the total ink limit LUT from the table database 124 that corresponds to the types of ink and paper detected by the ink-detecting unit 43 and paper-detecting unit 45. The selected total ink limit LUT is then used in the total ink quantity limiting process.

[Processes Executed on the Personal Computer and the Multifunction Device]

The processes implemented on the PC 1 and the multifunction device 2 will be described next in detail.

Figure 14:
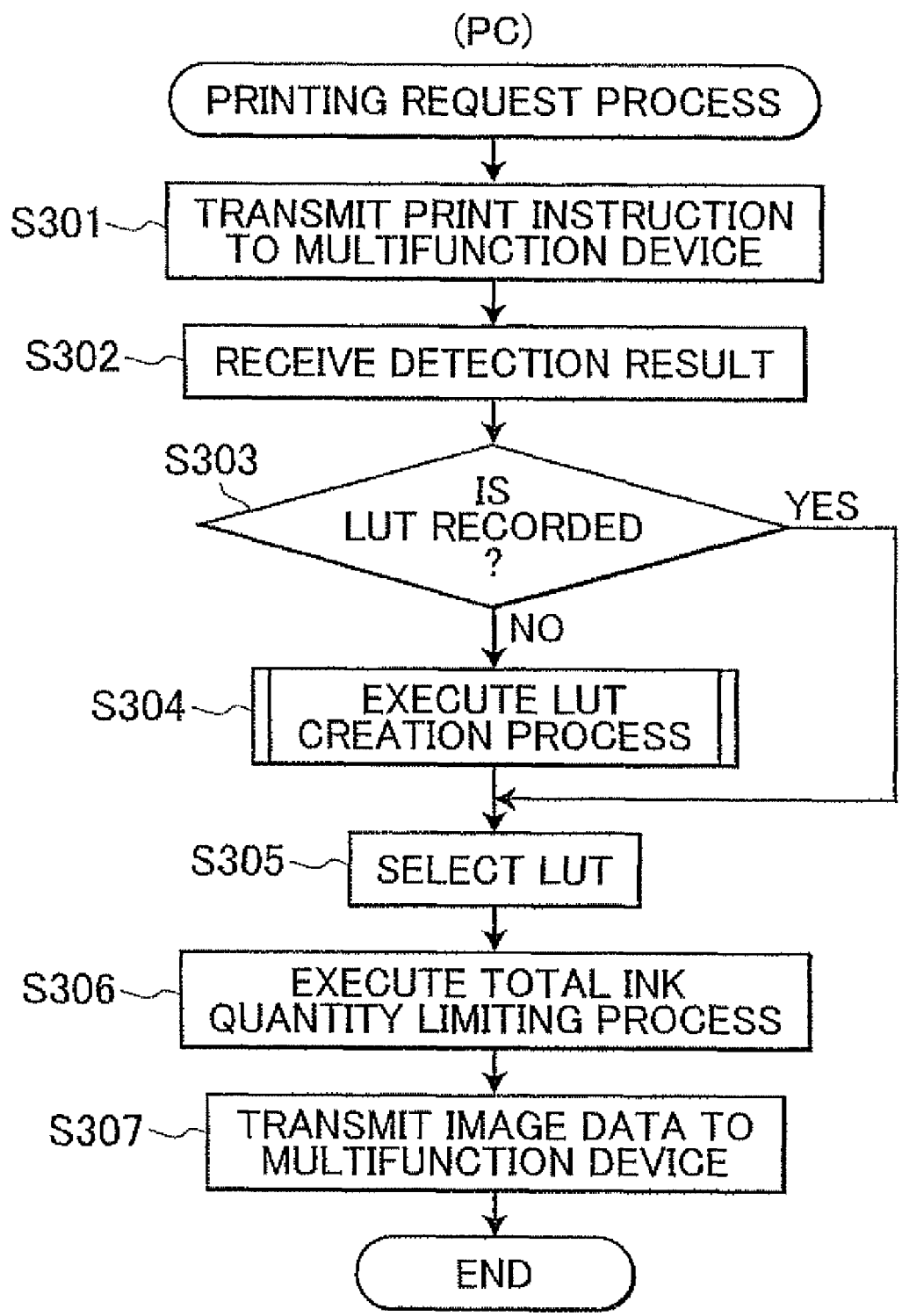
FIG. 14 is a flowchart illustrating steps in a printing request process executed by the personal computer according to the second embodiment.

FIG. 14 is a flowchart illustrating steps in a printing request process executed by the control unit 11 of the PC 1 (and more specifically the CPU 111). The control unit 11 executes this process when a condition has been met for issuing a print instruction to the multifunction device 2; for example, when the user has performed a print operation.

In S301 at the beginning of the printing request process, the control unit 11 performs a process to transmit a print instruction to the multifunction device 2. After receiving the print instruction, the multifunction device 2 detects the types of ink and paper used in printing and transmits these detection results to the PC 1 (S501-S503 described later).

In S302 the control unit 11 receives the detection results for ink and paper from the multifunction device 2. In S303 the control unit 11 determines whether a total ink limit LUT corresponding to these types of ink and paper is recorded in the table database 124 of the storage unit 12.

If in S303 the control unit 11 determines that a total ink limit LUT is not recorded for the types of ink and paper in the detection results, the control unit 11 executes an LUT creation process in S304 to create a new total ink limit LUT corresponding to the detected types of ink and paper before advancing to S305. The LUT creation process will be described later in greater detail with reference to FIG. 15.

However, the control unit 11 advances directly to S305 when determining in S303 that a total ink limit LUT corresponding to the detected types of ink and paper is already recorded. In S305 the control unit 11 (total ink limit LUT setting unit 17) selects the total ink limit LUT correlated with the detected types of ink and paper. If in S304 the LUT creation process has been executed, the control unit 11 (total ink limit LUT setting unit 17) selects the total ink limit LUT newly created in this process.

In S306 the control unit 11 performs a total ink quantity limiting process using the total ink limit LUT selected in S305 on RGB image data representing the image to be printed. In S307 the control unit 11 transmits the image data produced in S306 to the multifunction device 2 and subsequently ends the printing request process.

Figure 15:
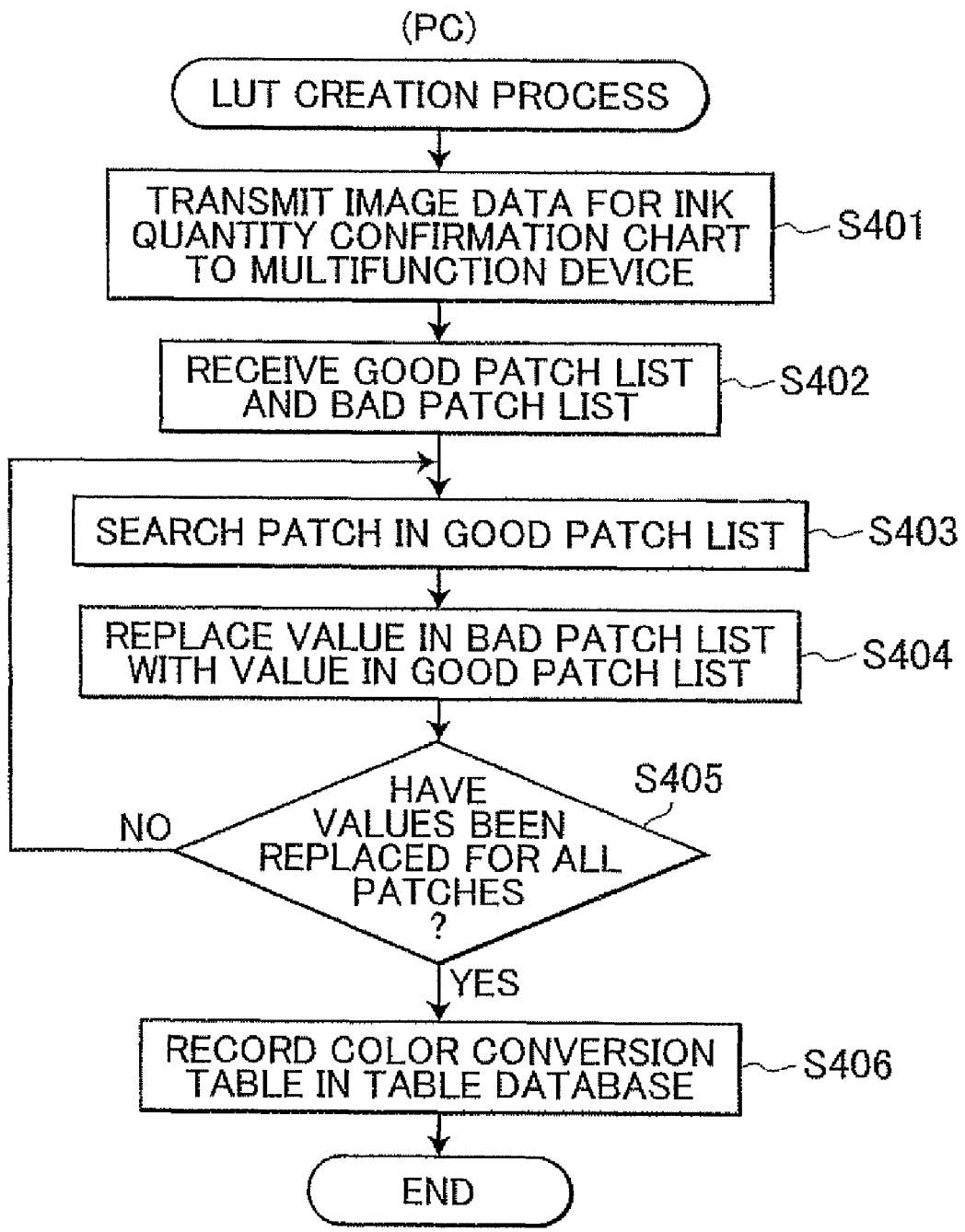
FIG. 15 is a flowchart illustrating steps in a LUT creation process executed by a personal computer according to the second embodiment.

Next, the LUT creation process executed in S304 of the printing request process described above will be described in detail with reference to the flowchart in FIG. 15. In S401 at the beginning of the LUT creation process, the control unit 11 transmits image data for the ink quantity confirmation chart (see FIG. 11) to the multifunction device 2. Upon receiving this image data, the multifunction device 2 prints the ink quantity confirmation chart onto paper. Next, the multifunction device 2 scans both surfaces of the printed sheet, creates a good patch list and a bad patch list, and transmits the data for the lists to the PC 1 (S601-S605 described later).

In s402 the control unit 11 receives the good patch list and the bad patch list from the multifunction device 2. In S403 the control unit 11 selects one patch to be processed from the bad patch list received in S402 and searches the good patch list for a patch having YCrCb values closest to the YCrCb values of the selected bad patch. This method for selecting the good patch is the same with the method described in S205. The control unit 11 repeatedly performs the process in S403-S405 until all patches in the bad patch list have been processed, while selecting an unprocessed patch in S403 on each repetition.

In S404 the control unit 11 replaces the RGB values for the selected patch in the bad patch list with the RGB values for the good patch found in S403. In S405 the control unit 11 determines whether a replacement process has been performed to replace the RGB values for all patches in the bad patch list (whether all bad patches have been processed).

The control unit 11 returns to S403 upon determining in S405 that the replacement process has not been performed for all bad patches (there remain unprocessed patches). However, if the control unit 11 determines in S405 that the replacement process has been performed for all bad patches, in S406 the control unit 11 creates a color conversion table for converting input RGB values to output RGB values and records this table in the table database 124 of the storage unit 12 as a total ink limit LUT. Subsequently, the control unit 11 ends the LUT creation process.

Figure 16:
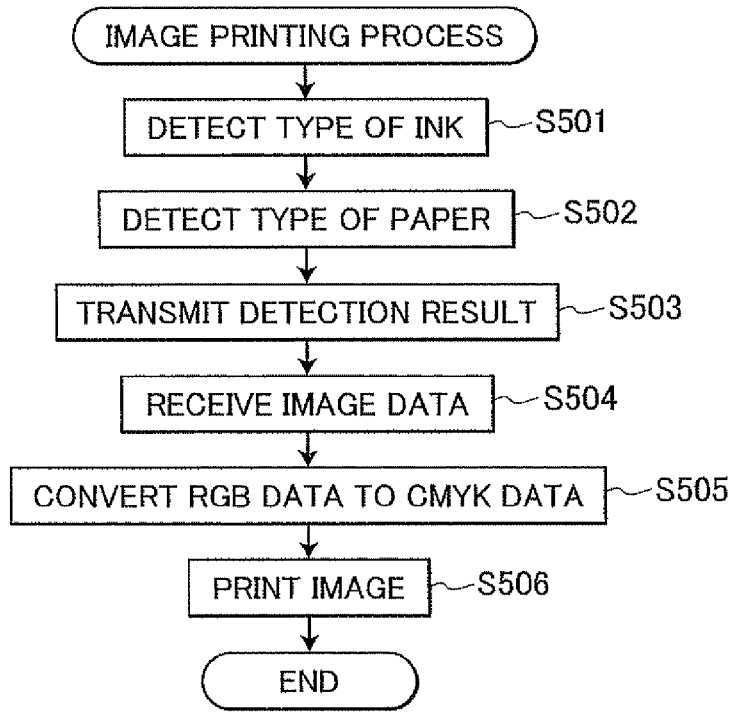
FIG. 16 is a flowchart illustrating steps in an image printing process executed by a multifunction device according to the second embodiment.

Next, the process executed on the multifunction device 2 will be described. FIG. 16 is a flowchart illustrating steps in an image printing process executed by the control unit 21 of the multifunction device 2 (and specifically the CPU 211). The control unit 21 executes this process when a print instruction is received from the PC 1.

In S501 at the beginning of the image printing process, the control unit 21 detects the type of ink (ID number) used in printing. In S502 the control unit 21 detects the type of paper (subregion number) to be used in printing.

In S503 the control unit 21 transmits detection results for the types of ink and paper detected in S501 and S502 to the PC 1. Consequently, the PC 1 selects the total ink limit LUT corresponding to the detected types of ink and paper, performs a total ink quantity limiting process on RGB image data representing the image to be printed by using this selected total ink limit LUT, and transmits the processed image data to the multifunction device 2 (S302-S307 described above).

In S504 the control unit 21 receives the image data produced in the total ink quantity limiting process from the PC 1. In S505 the control unit 21 converts the image data received in S504 from RGB data to CMYK data.

In S506 the control unit 21 performs a process to print an image based on the CMYK data produced in S505. Subsequently, the control unit 21 ends the image printing process.

Figure 17:
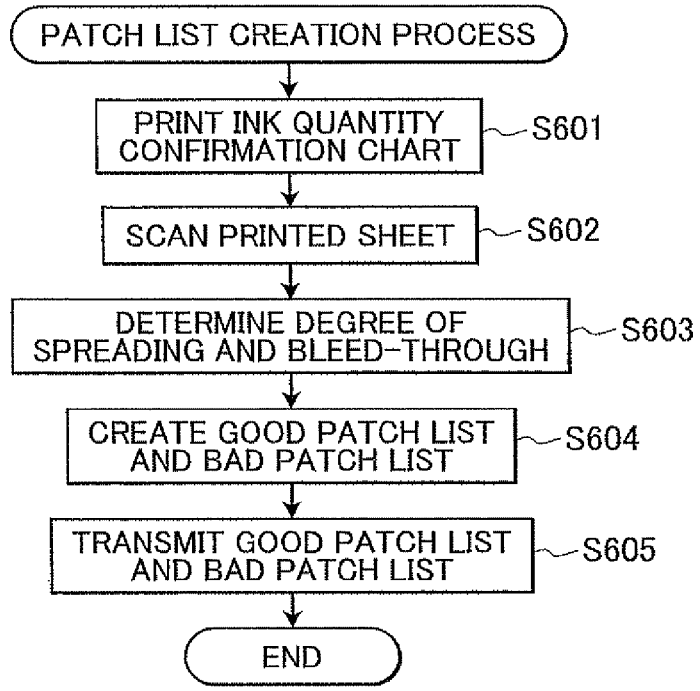
FIG. 17 is a flowchart illustrating steps in a patch list creation process executed by the multifunction device according to the second embodiment.

FIG. 17 is a flowchart illustrating steps in a patch list creation process executed by the control unit 21 (and more specifically, the CPU 211) of the multifunction device 2. The control unit 21 executes the process upon receiving image data for the ink quantity confirmation chart from the PC 1.

In S601 at the beginning of the patch list creation process, the control unit 21 performs a process to print the ink quantity confirmation chart (see FIG. 11) on paper. In S602 the scanning unit 26 scans both surfaces (the printed surface and the back surface) of the sheet on which the ink quantity confirmation chart has been printed in S601. To accomplish this process, the control unit 21 displays a message on the display unit 25 prompting the user to perform the scanning operation.

In S603 the control unit 21 determines the degree of spreading for each patch based on the scanned image of the printed surface, and determines the degree of bleed-through for each patch based on the scanned image of the back surface.

In S604 the control unit 21 creates a good patch list including patches found in S603 to have a satisfactory degree of spreading and bleed-through, and a bad patch list including the remaining patches found in S603 to be unsatisfactory. At this time, the control unit 21 calculates color values (YCrCb values in the embodiment) expressed by the lightness, saturation, and hue from the RGB values for each patch and correlates these color values with the RGB values.

In S605 the control unit 21 transmits the good patch list and bad patch list created in S604 to the PC 1 and subsequently ends the patch list creation process. As a consequence, the PC 1 creates a color conversion table for replacing RGB values in the bad patch list with RGB values from the good patch list and records the table in the table database 124 of the storage unit 12 as the total ink limit LUT (S402-S406).

[Effects]

The communication system according to the second embodiment described above obtains the same effects as described in the first embodiment.

In addition, the communication system according to the second embodiment stores the table database 124 in the storage unit 12 (hard disk drive) of the PC 1 having a larger capacity than the storage unit 22 (flash memory) of the multifunction device 2 (see FIG. 12). Hence, the storage capacity for the table database 124 can be made larger than that in the communication system according to the first embodiment. Further, details of the total ink quantity limiting process can easily be modified (adding total ink limit LUTs, for example) outside the multifunction device 2 (without adding means to the multifunction device 2 itself).

<Third Embodiment>

Figure 19:
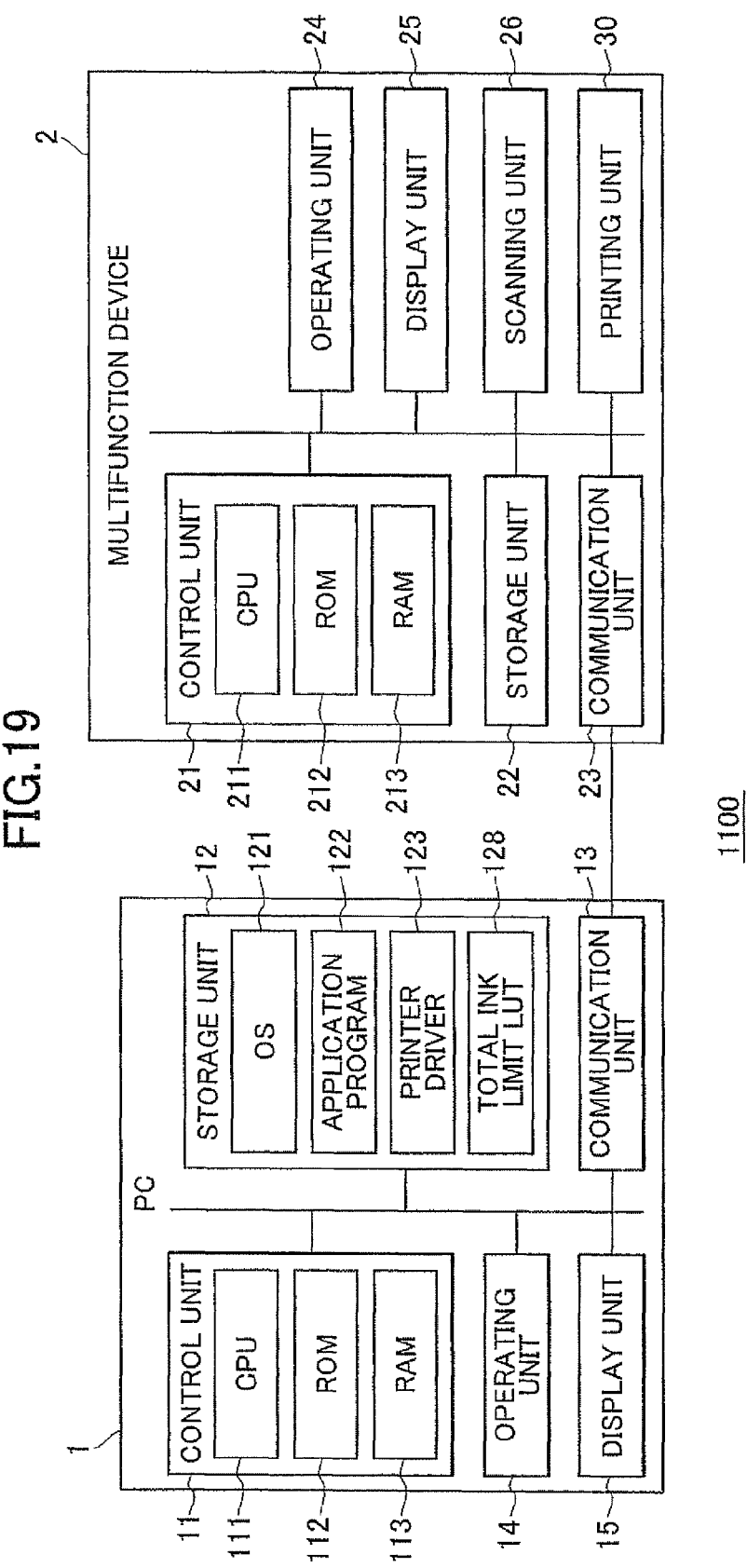
FIG. 19 is a block diagram showing an overall structure of a communication system according to a third embodiment.

The following description of a third embodiment will focus on points of difference from the first embodiment, wherein like parts and components are designated with the same reference numerals to avoid duplicating description. FIG. 19 is a block diagram showing the overall structure of a communication system 1100 according to the third embodiment. As shown in FIG. 19, the communication system 1100 according to the third embodiment differs from the communication system 100 according to the first embodiment in that the CPU 211 does not include the total ink limit LUT setting unit, in that the storage unit 22 of the multifunction device 2 does not include the table database 221, and in that the printing unit 30 does not include the ink-detecting unit 43 and the paper-detecting unit 45. The communication system 1100 also differs from the communication system 100 in that the storage unit 12 of the PC 1 includes the total ink limit LUT 128. The storage unit 12 also stores programs that instruct the CPU 111 to execute a process described later with reference to FIG. 21. In the first embodiment, the multifunction device performs the LUT creation process. In the third embodiment, the PC 1 performs an LUT creation process.

Figure 20:
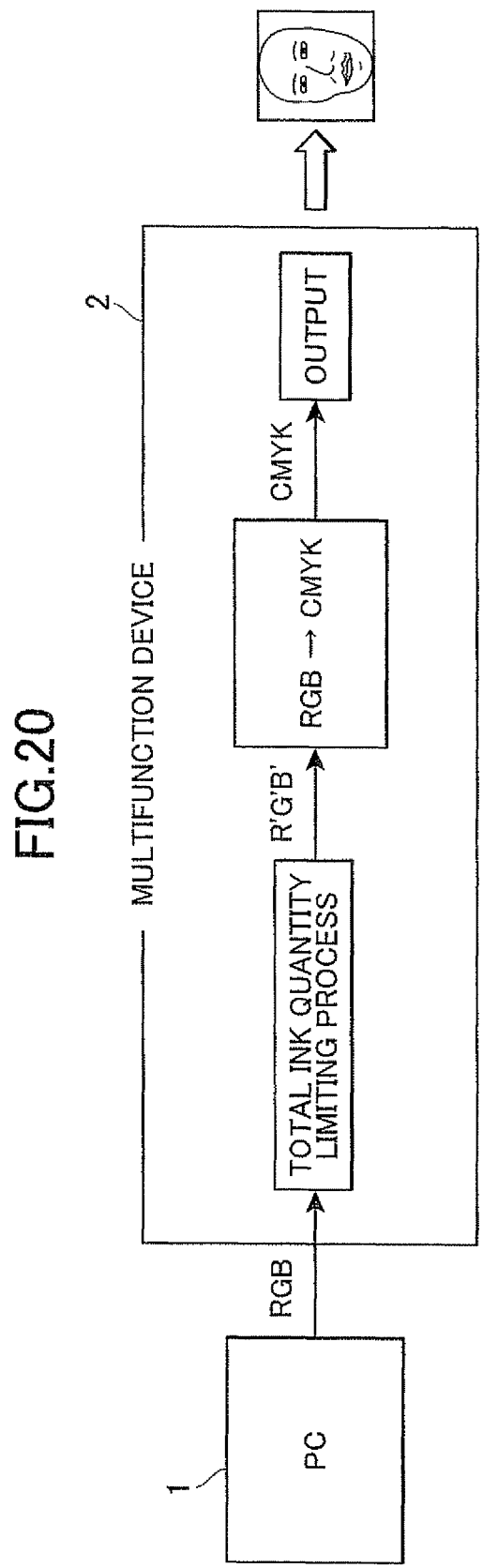
FIG. 20 is a block diagram illustrating processes executed by the communication system according to the third embodiment.

FIG. 20 is a block diagram illustrating processes executed by the communication system according to the third embodiment. The PC 1 issues a print instruction by transmitting image data (RGB data) rendering an image to be printed in the RGB color space to the multifunction device 2. When the multifunction device 2 receives a print instruction from the PC 1, the multifunction device 2 performs a process to limit the total quantity of ink used in the printing operation. In this total ink quantity limiting process, the multifunction device 2 converts the image data (RGB data) received from the PC 1 to image data (R'G'B' data that is represented in the RGB color space) restricting the total quantity of ink to be used in the printing operation. Next, the multifunction device 2 converts the resulting image data (R'G'B' data) in the RGB color space to corresponding image data in the CMYK color space and prints an image based on the CMYK image data.

[Processes Executed on the Personal Computer and the Multifunction Device]

Next, the processes implemented on the PC 1 and the multifunction device 2 will be described in detail.

Figure 21:
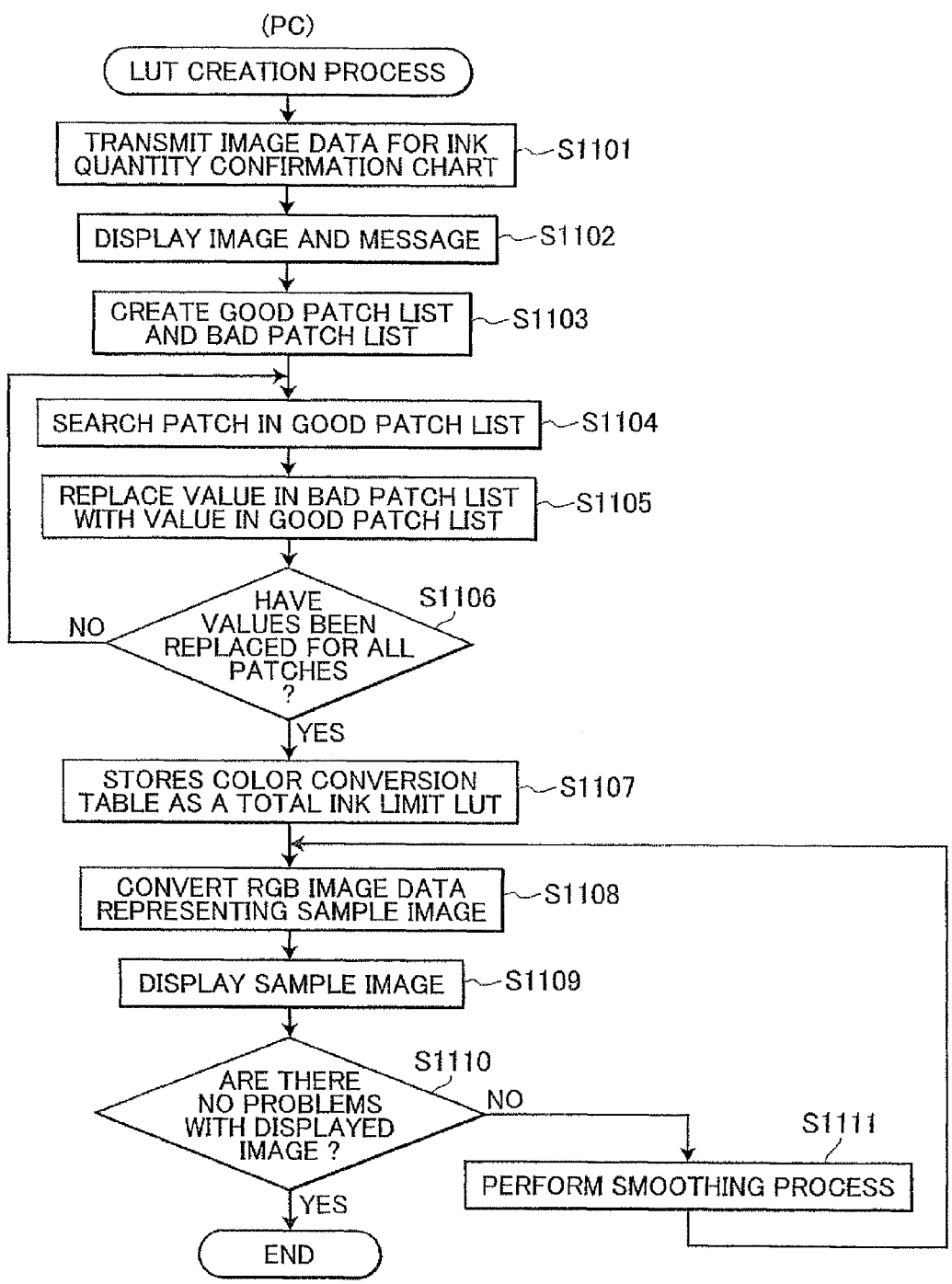
FIG. 21 is a flowchart illustrating steps in a LUT creation process executed by a personal computer according to the third embodiment.

FIG. 21 is a flowchart illustrating steps in a LUT creation process executed by the control unit 11 (and more specifically the CPU 111) of the PC 1. The control unit 11 begins this LUT creation process when the user performs an operation on the PC 1 indicating a desire to create a new total ink limit LUT 128.

In S1101 at the beginning of the LUT creation process, the control unit 11 transmits image data for the ink quantity confirmation chart (see FIG. 11) to the multifunction device 2. By forming the process in S1101, the control unit 11 instructs the multifunction device 2 to print the ink quantity confirmation chart onto paper.

In S1102 the control unit 11 prompts the user to visually check both surfaces (the printed surface and the back surface) of the sheet on which the multifunction device 2 has printed the ink quantity confirmation chart and to determine the degree of spreading when viewing the printed surface and the degree of bleed-through when viewing the back surface for each patch. More specifically, the control unit 11 displays an image of the printed ink quantity confirmation chart on the display unit 15 and prompts the user to select patches exhibiting spreading or bleed-through (i.e., displays a message prompting the user to select patches).

In S1103 the control unit 11 creates a good patch list including patches that have not been selected by the user in S1102 for having a satisfactory degree of spreading and bleed-through, and a bad patch list including the patches that have selected by the user in S1102 for having an unsatisfactory degree of spreading and bleed-through. At this time, the control unit 11 calculates color values (YCrCb values) expressed by the lightness, the saturation, and the hue from the RGB values for each patch and correlates these color values with the RGB values.

Steps S1104-S1107 are the same with the steps S205-S208 except that the control unit 11 performs the steps S1104-S1106 instead of the control unit 21. Thus, in S1107 the control unit 11 creates a new total ink limit LUT 128.

When in S1106 the control unit 11 determines that RGB values have been replaced for all patches in the bad patch list, in S1107 the control unit 11 creates a color conversion table for converting input RGB values to output RGB values and stores this color conversion table in the storage unit 12 as a total ink limit LUT 128. More specifically, the control unit 11 creates a color conversion table by RGB values for each patch in the ink quantity confirmation chart as input RGB values and RGB values in the good patch list or the bad patch list as output RGB values. Hence, the color conversion table does not change input RGB values that have been sorted into the good patch, but converts only input RGB values that have been sorted into the bad patch list to RGB values of patches in the good patch list (RGB values of good patches having the smallest difference in YCrCb values from those of the bad patch) based on the replacement process performed in S1105

In S1108 the control unit 11 performs a process using the total ink limit LUT 128 newly created in S1107 to convert prestored RGB image data representing a sample image. As explained in FIG. 2, since the control unit 21 converts the RGB image data, in S1108, the control unit 11 simulates this conversion of the RGB image data in order to present, to the user, the result of the conversion on the display unit 15. That is, the control unit 21 performs the same total ink conversion process performed in the multifunction device 2.

In S1109 the control unit 11 displays the sample image formed by the RGB image data converted in S1108 on the display unit 15 and also displays a message prompting the user to indicate whether there are no problems in the displayed results of the conversion process. In other words, as shown in FIG. 22(*a*), in S1108 the control unit 11 obtains the converted RGB image data being the same with the converted RGB image data obtained by the control unit 21 in the print process. Thus, the control unit 11 displays the sample image that indicates the image to be printed.

In S1110 the control unit 11 determines whether the user has responded to the sample image and message displayed on the display unit 15 in S1109 indicating that there are no problems with the results.

If in S1110 the control unit 11 determines that a response indicating no problems with the conversion results has not been received, then in S1111 the control unit 11 performs a smoothing process on the total ink limit LUT 128 created in S1107 and recorded in the storage unit 12 to smooth out irregularities in the output RGB values. Subsequently, the control unit 11 returns to S1108 and repeats the above process using the new total ink limit LUT 128.

However, if in S1110 the control unit 11 determines that a response indicating no problems with the conversion results has been received, then the control unit 11 ends the LUT creation process.

Next, the process executed by the multifunction device 2 will be described. FIG. 23 is a flowchart illustrating steps in an image printing process executed by the control unit 21 (and more specifically the CPU 211) of the multifunction device 2 when the multifunction device 2 receives a print instruction from the PC 1.

In s1201 at the beginning of the image printing process, the control unit 21 performs a total ink quantity limiting process on the RGB image data received from the PC 1 using the total ink limit LUT 128 stored on the PC 1. The multifunction device 2 may acquire the total ink limit LUT 128 from the PC 1 by transmitting a transmission request to the PC 1, or the PC 1 may simply transmit the total ink limit LUT 128 together with the print instruction.

In S1202 the control unit 21 converts the RGB image data produced from the process in S1201 to CMYK data. In S1203 the control unit 21 performs a process to print images based on the CMYK data produced in the process of S1202. Subsequently, the image printing process ends.

[Effects]

In the communication system according to the embodiment described above, the multifunction device 2 performs the total ink quantity limiting process on three-dimensional RGB data prior to converting the data to four-dimensional CMYK data corresponding to the ink colors (S1201). Accordingly, the multifunction device 2 can more easily modify steps in the total ink quantity limiting process (add a total ink limit LUT 128, for example) than when performing the total ink quantity limiting process after converting RGB data to CMYK data, as illustrated in FIG. 18. Moreover, this process reduces the size of the total ink limit LUT 128, thereby reducing the amount of memory required and improving processing speed.

Especially, the converted three-dimensional data (RGB data) is useful for displaying the image on the display unit because of the following reason: FIG. 22(*b*) shows an explanatory diagram showing a comparative process for displaying a sample image on the display unit 15. In this comparative example, the total ink quantity limiting process is performed after the RGB data is converted to the CMYK data. In order to display the result of the conversion on the display unit 15, the multifunction device 2 needs to further convert the CMYK data into the RGB data. On the other hand, in the present embodiment, the three-dimensional RGB data is directly obtained from the total ink quantity limiting process. That is, the three-dimensional RGB data is directly used to display the image on the display unit 15. Further, the three-dimensional RGB data is particularly useful in that this data can be more accurately matched with the three-dimensional monitor signals, without having to reduce the number of dimensions in the post-process image data as the comparative example shown in FIG. 22(*b*). As a result, the RGB data can more accurately be simulated on a monitor than the CMYK data.

Since the multifunction device 2 can limit the total ink quantity using a lookup table (total ink limit LUT 128), complex restrictions based on combinations of ink can be accomplished easily, reducing the computational load on the multifunction device 2.

In this communication system 1100, the total ink limit LUT 128 is stored in the storage unit 12 (hard disk drive) of the PC 1, which has a larger capacity that the storage unit 22 (flash memory) of the multifunction device 2. Therefore, a larger storage capacity can be provided for the total ink limit LUT 128 than when storing the total ink limit LUT 128 on the multifunction device 2. In addition, steps in the total ink quantity limiting process can easily be modified externally (i.e., without adding means to the multifunction device 2 itself).

On the other hand, since the PC 1 in this communication system 1100 performs a process to newly create the total ink limit LUT 128 (S1101-S1111), a suitable total ink quantity limiting process can be performed based on the printing conditions, such as the types of ink and paper, thereby achieving satisfactory printing results. The communication system 1100 also reduces the likelihood of such problems as the multifunction device 2 ejecting a quantity of ink that exceeds the upper limit of ink absorbency in the paper, whereby non-absorbed ink can become deposited inside the multifunction device 2 and shorten the life of the multifunction device 2. For example, unforeseen types of paper and ink may be newly developed after the printing device (the multifunction device 2 in the embodiment) has been manufactured. In addition to specialty printing paper and specialty printing ink, there is also a wide variety of all-purpose paper and refilled ink cartridges in circulation and an increasing number of users are making use of these products. Accordingly, it is very useful to be able to create a new total ink limit LUT 128 suited to new printing conditions.

Further, since the PC 1 creates the total ink limit LUT 128 by replacing values in the bad patch list with values from the good patch list based on the results of printing color patches, the PC 1 can easily create a total ink limit LUT 128 capable of achieving satisfactory printing results, while preventing a drop in printing quality caused by using an excessive amount of ink.

<Modifications>

While the invention has been described in detail with reference to the above embodiments thereof, it would be apparent to those skilled in the art that various changes and modifications may be made therein without departing from the spirit of the invention.

[Modification of Paper Type Detection]

In the embodiments described above, the paper-detecting unit 45 always detects the type of paper to be used in printing. However, the multifunction device 2 need not perform detection with the paper-detecting unit 45 when the type of paper is specified by the PC 1, for example.

In this case, the printer driver 123 normally functions to prompt the user to set the type of paper that will be used in printing during the printing operation performed on the PC 1. Hence, the paper-detecting unit 45 need not detect the type of paper when the user-specified type of paper falls within the foreseen types of paper (specialty paper for use on the multifunction device 2, for example). The paper-detecting unit 45 need only detect the type of paper when the specified type has not been set in advance. This method can reduce the likelihood of an incorrect detection of the type of paper for environments in which paper other than a type that can be used in printing is unlikely to be specified by accident.

Further, if the user is prompted to identify the type of paper to be used in printing from among only paper types that are allowed, the multifunction device 2 need not be provided with the paper-detecting unit 45.

[Modification of Total Ink Quantity Limiting Process]

In the second embodiment described above, the PC 1 executes the total ink quantity limiting process, but this process may be performed on the multifunction device 2 instead, for example. In the latter case, the multifunction device 2 may acquire the total ink limit LUT to be used in the total ink quantity limiting process by transmitting a transmission request to the PC 1, for example. Alternatively, the PC 1 may transmit the total ink limit LUT together with the print instruction.

In the embodiments described above, the total ink quantity limiting process is performed prior to converting image data from the RGB color space to the CMYK color space, but this total ink quantity limiting process may also be performed after converting image data to the CMYK color space.

[Modification of LUT Creation Process]

In the first and second embodiments described above, the control unit 21 controls the scanning unit 26 to scan both surfaces of the sheet on which the ink quantity confirmation chart has been printed and to determine the degree of spreading and the degree of bleed-through for each patch automatically based on the scanned images, but the invention is not limited to this method. For example, the user may be prompted to visually confirm the printed matter and to determine the degree of spreading and bleed-through of the image.

In the third embodiment described above, the control unit 21 prompts the user to visually confirm the sheet on which the ink quantity confirmation chart has been printed and to determine the degree of spreading and bleed-through of the image, but the invention is not limited to this method. For example, the control unit 21 may instead control the scanning unit 26 of the multifunction device 2 to scan both surfaces of the printed matter and to determine the degree of spreading and the degree of bleed-through for each patch automatically based on the scanned images.

In the embodiments described above, color difference $\Delta E$ is found according to Equation (1). However, a hue-weighted search (search with a larger e value) may be performed by first calculating a zenith angle $\phi$ and an azimuth angle $\theta$ in Equations (2) and (3) below. Here, the zenith angle $\phi$ and the azimuth angle $\theta$ is coordinate values in YCrCb space represented in the spherical polar coordinate system. Subsequently, using the zenith angle $\phi$ and the azimuth angle $\theta$, the color difference $\Delta E$ is found from Equation (4). The subscript g indicates values found from YCrCb values of a good patch, while the subscript b indicates values found from YCrCb values of a bad patch, and d and e represent weighting coefficients. These color-difference calculations are also not limited to the YCrCb color space, but may be performed in other color spaces, such as Lab and CIECAM02.

$$\phi = \tan^{-1}\left(\frac{Y - 128}{\sqrt{Cr^2 + Cb^2}}\right) \quad \text{Equation (2)}$$

$$\theta = \tan\left(\frac{Cb}{Cr}\right) \quad \text{Equation (3)}$$

$$\Delta E = \sqrt{d(\phi_g - \phi_b)^2 + e(\theta_g - \theta_b)^2} \quad \text{Equation (4)}$$

Further, in the embodiments described above, the PC 1 or the multifunction device 2 instruct the detecting units 43 and 45 to detect the types of paper and ink provided in the multifunction device 2 and creates a total ink limit LUT when necessary each time a printing process is executed, but the invention is not limited to this timing. For example, PC 1 or the multifunction device 2 may control the detecting units 43 and 45 to detect the types of ink and paper and create a total ink limit LUT based on the detection results each time paper is loaded or an ink cartridge is replaced. Specifically, the PC 1 or the multifunction device 2 determines whether the proper total ink limit LUT exists when the ink-detecting unit 43 or the paper-detecting unit 45 detects a new ink cartridge or a new paper. At this time, the detecting unit 43 or 45 detects the type of ink in the newly mounted ink cartridge or the type of newly loaded paper. If a total ink limit LUT corresponding to the detected types of ink and paper has not been recorded, the PC 1 or the multifunction device 2 creates a new total ink limit LUT based on the detected types of ink and paper. With this method, the proper total ink limit LUT is recorded prior to executing a printing process. Accordingly, the control unit 11 or 21 can read the total ink limit LUT corresponding to the types of ink and paper to be used in the printing operation from the stored total ink limit LUTs and can perform the total ink quantity limiting process and printing process using this total ink limit LUT.

Alternatively, when the ink-detecting unit 43 detects that the ink cartridge 40 has been replaced, the control unit 11 or 21 may determine whether a total ink limit LUT corresponding to the ID number of the new ink cartridge 40 is recorded. If the control unit determines that the corresponding total ink limit LUT is already recorded, the control unit may delete the total ink limit LUT recorded for this ID number. By deleting the total ink limit LUT corresponding to the ID number in this way, the control unit ensures that a new total ink limit LUT will be created when performing an image printing process. Hence, the control unit can reliably restrict the total quantity of ink based on a total ink limit LUT corresponding to the type of ink being used, even when the replacement cartridge is the same as the replaced cartridge but the ink contained therein is different, such as in the case of refill ink cartridges.

[Modification of Color Material]

In the example of the embodiments, the PC 1 employs an inkjet printing unit 30 for printing images using four colors of ink (cyan, magenta, yellow, and black), but the invention is not limited to this system. For example, the printing unit may employ more colors of ink. Further, the color material is not limited to ink. For example, the printing unit may employ a laser transfer system for forming images using toner in a plurality of colors. In this case, the bad patches are determined based on the degree of deterioration in toner fixing.

[Modification of Image Data]

In the embodiments described above, the image data inputted into the multifunction device 2 is RGB data, but the invention is not limited to this type of data and may be applied to devices that use data in other formats.

What is claimed is:

1. An image-processing system for printing an image based on original image data having a color value, the image-processing system comprising:
   a storing unit that stores at least one look-up table in association with at least one printing condition, the at least one look-up table being used to convert a color value in original image data into a limited color value that limits a total quantity of ink to be used in printing;
   a detecting unit that detects, as a printing condition, at least one of a type of color material and a type of recording medium which are used for printing operation;
   a converting unit that converts the color value in the original image data into the limited color value by using a look-up table that is assigned with a printing condition corresponding to the detected printing condition;
   a determining unit that determines whether the detected printing condition corresponds to one of the at least one printing condition assigned with the at least one look-up table; and
   a creating unit that creates a new look-up table corresponding to the detected printing condition when the determining unit determines that the detected printing condition does not correspond to any of the at least one printing condition assigned with the at least one look-up table stored in the storing unit.

2. The image-processing system according to claim 1, further comprising:
   a printing device that includes the storing unit, the detecting unit, the converting unit, and a printing unit that is configured to print the image; and
   a data processing device that is configured to send the original image data to the printing device.

3. The image-processing system according to claim 1, wherein the creating unit includes:
   a color chart printing unit that prints a color chart image based on chart image data having a plurality of sets of color patch data under the detected printing condition, each set of color patch data having a color value;
   a classifying unit that classifies each of the color values of the plurality of sets of the color patch data into either one of a first list and a second list based on the printed color chart image;
   a look-up table creating unit that creates the new look-up table that corresponds to the detected printing condition and that is configured to convert a color value belonging to the second list into a color value belonging to the first list.

4. The image-processing system according to claim 1, further comprising a printing data conversion unit that converts the limited color value into a printing color value that specifies a quantity of the color material to be used in printing.

5. The image-processing system according to claim 4 wherein the color value is represented in an N dimensional color space and the printing color value is represented in an M dimensional color space, N being larger than M.

6. The image-processing system according to claim 4, further comprising:
   a printing device that includes the detecting unit, the printing data conversion unit, and a printing unit that is configured to print the image; and
   a data processing device that includes the converting unit and the storing unit, the data processing device being configured to receive the detected printing condition from the printing device and to send the limited color value to the printing device.

7. The image-processing system according to claim 1, wherein the storing unit stores a plurality of look-up tables in one to one correspondence a plurality of printing conditions, wherein the converting unit selects one look-up table corresponding to the detected printing condition among the plurality of look-up tables and converts the color value in the original image data into the limited color value by using the selected look-up table.

8. A non-transitory computer-readable storage medium storing a set of program instructions executable on a computer that includes a storing unit that stores at least one look-up table in association with at least one printing condition, the at least one look-up table being used to convert a color value in original image data into a limited color value that limits a total quantity of ink to be used in printing, the program instructions comprising:
   detecting, as a printing condition, at least one of a type of color material and a type of recording medium which are used for printing operation;
   converting the color value in the original image data into the limited color value by using a look-up table that is assigned with a printing condition corresponding to the detected printing condition;

determining whether the detected printing condition corresponds to one of the at least one printing condition assigned with the at least one look-up table; and creating a new look-up table corresponding to the detected printing condition when the determining unit determines that the detected printing condition does not correspond to any of the at least one printing condition assigned with the at least one look-up table stored in the storing unit.

9. An image-processing method for controlling an image-processing system that includes a storing unit that stores at least one look-up table in association with at least one printing condition, the at least one look-up table being used to convert a color value in original image data into a limited color value that limits a total quantity of ink to be used in printing, the image-processing method comprising:

detecting, as a printing condition, at least one of a type of color material and a type of recording medium which are used for printing operation;

converting the color value in the original image data into the limited color value by using a look-up table that is assigned with a printing condition corresponding to the detected printing condition;

determining whether the detected printing condition corresponds to one of the at least one printing condition assigned with the at least one look-up table; and creating a new look-up table corresponding to the detected printing condition when the determining unit determines that the detected printing condition does not correspond to any of the at least one printing condition assigned with the at least one look-up table stored in the storing unit.

10. An image-processing system for printing an image based on original image data having a color value, the image-processing system comprising:

a storing unit that stores at least one look-up table in association with at least one printing condition, the at least one look-up table being used to convert a color value in original image data into a limited color value that limits a total quantity of ink to be used in printing;

a detecting unit that detects, as a printing condition, at least one of a type of color material and a type of recording medium which are used for printing operation;

a converting unit that converts the color value in the original image data into the limited color value by using a look-up table that is assigned with a printing condition corresponding to the detected printing condition; and a printing data conversion unit that converts the limited color value into a printing color value that specifies a quantity of the color material to be used in printing;

wherein the color value is represented in an N dimensional color space and the printing color value is represented in an M dimensional color space, N being larger than M.

11. A non-transitory computer-readable storage medium storing a set of program instructions executable on a computer that includes a storing unit that stores at least one look-up table in association with at least one printing condition, the at least one look-up table being used to convert a color value in original image data into a limited color value that limits a total quantity of ink to be used in printing, the program instructions comprising:

detecting, as a printing condition, at least one of a type of color material and a type of recording medium which are used for printing operation;

converting the color value in the original image data into the limited color value by using a look-up table that is assigned with a printing condition corresponding to the detected printing condition; and converting the limited color value into a printing color value that specifies a quantity of the color material to be used in printing;

wherein the color value is represented in an N dimensional color space and the printing color value is represented in an M dimensional color space, N being larger than M.

12. An image-processing method for controlling an image-processing system that includes a storing unit that stores at least one look-up table in association with at least one printing condition, the at least one look-up table being used to convert a color value in original image data into a limited color value that limits a total quantity of ink to be used in printing, the image-processing method comprising:

detecting, as a printing condition, at least one of a type of color material and a type of recording medium which are used for printing operation; and converting the color value in the original image data into the limited color value by using a look-up table that is assigned with a printing condition corresponding to the detected printing condition; and converting the limited color value into a printing color value that specifies a quantity of the color material to be used in printing;

wherein the color value is represented in an N dimensional color space and the printing color value is represented in an M dimensional color space, N being larger than M.

* * * * *